US012189493B1

(12) United States Patent
Qin et al.

(10) Patent No.: US 12,189,493 B1
(45) Date of Patent: Jan. 7, 2025

(54) METHODS AND SYSTEMS FOR IMPROVED DEDUPLICATION PERFORMANCE USING PREFETCHED BACKUP INFORMATION

(71) Applicant: Veritas Technologies LLC, Santa Clara, CA (US)

(72) Inventors: Yaobin Qin, Minneapolis, MN (US); Xianbo Zhang, Plymouth, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 130 days.

(21) Appl. No.: 16/836,306

(22) Filed: Mar. 31, 2020

Related U.S. Application Data

(60) Provisional application No. 62/969,082, filed on Feb. 2, 2020.

(51) Int. Cl.
  *G06F 11/14* (2006.01)
  *G06F 9/30* (2018.01)
  (Continued)

(52) U.S. Cl.
  CPC ...... *G06F 11/1464* (2013.01); *G06F 9/30047* (2013.01); *G06F 11/1451* (2013.01);
  (Continued)

(58) Field of Classification Search
  CPC ............. G06F 11/1464; G06F 9/30047; G06F 11/1451; G06F 11/1461; G06F 11/1469;
  (Continued)

(56) References Cited

U.S. PATENT DOCUMENTS

| 8,315,992 B1 | 11/2012 | Gipp et al. |
| 8,935,446 B1 * | 1/2015 | Shilane ............... G06F 12/0871 |
| | | 710/62 |

(Continued)

FOREIGN PATENT DOCUMENTS

| CN | 110569245 A | * | 12/2019 | |
| WO | WO-2020112025 A1 | * | 6/2020 | ............. G06F 30/27 |

OTHER PUBLICATIONS

Zhu, Benjamin, et al., "Avoiding the Disk Bottleneck in the Data Domain Deduplication File System", USENIX Association, Fast 2008: 6th USENIX Conference on File and Storage Technologies, 2008, pp. 269-282.

*Primary Examiner* — Gautam Sain
*Assistant Examiner* — Wei Ma
(74) *Attorney, Agent, or Firm* — Campbell Stephenson LLP

(57) ABSTRACT

Methods, computer program products, computer systems, and the like are disclosed that provide for improved deduplication performance using prefetched backup information. For example, such methods, computer program products, and computer systems can include generating new feature information for a new backup image, (for each existing backup image in a plurality of existing backup images) comparing the new feature information with existing feature information for the each existing backup image, identifying one or more existing backup images of the plurality of existing backup images, and prefetching the one or more existing backup images. The feature information is generated as an output of a machine learning process. The machine learning process receives at least a portion of data of the new backup image as an input. The one or more existing backup images are identified based, at least in part, on a result of the comparing.

20 Claims, 20 Drawing Sheets

(51) Int. Cl.
*G06F 18/21* (2023.01)
*G06N 20/00* (2019.01)

(52) U.S. Cl.
CPC ...... *G06F 11/1461* (2013.01); *G06F 11/1469* (2013.01); *G06F 18/21* (2023.01); *G06N 20/00* (2019.01); *G06F 2201/84* (2013.01)

(58) Field of Classification Search
CPC ............. G06F 2201/84; G06F 11/1453; G06K 9/6217; G06N 20/00
USPC ......................................................... 711/162
See application file for complete search history.

(56) References Cited

U.S. PATENT DOCUMENTS

| | | | |
|---|---|---|---|
| 9,134,914 B1 | 9/2015 | Derbeko et al. | |
| 9,575,680 B1 * | 2/2017 | Zhang | G06F 11/1469 |
| 9,733,846 B1 | 8/2017 | Wigmore et al. | |
| 10,380,074 B1 * | 8/2019 | Gu | G06F 16/1752 |
| 10,592,149 B1 | 3/2020 | Jenkins et al. | |
| 2010/0074439 A1 * | 3/2010 | Howells | G06F 18/2135 380/28 |
| 2012/0303866 A1 | 11/2012 | Bandic et al. | |
| 2014/0074804 A1 * | 3/2014 | Colgrove | G06F 3/0689 707/692 |
| 2015/0019499 A1 * | 1/2015 | Aronovich | G06F 16/137 707/692 |
| 2017/0090786 A1 | 3/2017 | Parab et al. | |
| 2018/0173732 A1 * | 6/2018 | Wu | G06F 16/1748 |
| 2019/0213088 A1 * | 7/2019 | Olson | G06F 12/12 |
| 2019/0310591 A1 * | 10/2019 | Hazard | G05B 13/04 |
| 2021/0191911 A1 * | 6/2021 | Ponnala | H04L 9/0643 |
| 2021/0240377 A1 | 8/2021 | VanderSpek et al. | |

* cited by examiner

METHODS AND SYSTEMS FOR IMPROVED DEDUPLICATION PERFORMANCE USING PREFETCHED BACKUP INFORMATION

CROSS-REFERENCE TO RELATED APPLICATIONS

This application claims benefit under 35 U.S.C § 119 (e) of Provisional Patent Application No. 62/969,082, filed on Feb. 2, 2020, entitled "METHODS AND SYSTEMS FOR IMPROVED DEDUPLICATION PERFORMANCE USING PREFETCHED BACKUP INFORMATION," and having Y. Qin and X. Zhang as inventors. The above-referenced application is hereby incorporated by reference herein, in its entirety and for all purposes.

FIELD OF THE INVENTION

The present invention relates to deduplication systems and, more particularly, to methods and systems for improved deduplication performance using prefetched backup information.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a unit of information only once. Thus, in a backup scenario, if a unit of information is stored in multiple locations within an enterprise, only one copy of that unit of information will be stored in a deduplicated backup storage volume. Similarly, if the unit of information does not change during a subsequent backup, another copy of that unit of information need not be stored, so long as that unit of information continues to be stored in the deduplicated backup storage volume. Data deduplication can also be employed outside of the backup context, thereby reducing the amount of information needing to be transferred and the active storage occupied by duplicate units of information.

SUMMARY

The present disclosure describes methods, computer program products, computer systems, and the like are disclosed that provide for improved deduplication performance using prefetched backup information, in an efficient and effective manner. Such methods, computer program products, and computer systems include generating new feature information for a new backup image, (for each existing backup image in a plurality of existing backup images) comparing the new feature information with existing feature information for the each existing backup image, identifying one or more existing backup images of the plurality of existing backup images, and prefetching the one or more existing backup images. The feature information is generated as an output of a machine learning process. The machine learning process receives at least a portion of data of the new backup image as an input. The one or more existing backup images are identified based, at least in part, on a result of the comparing.

In one embodiment, the generating includes producing pre-processed data by performing one or more data pre-processing operations on the at least the portion of the data, and producing the new feature information by performing a feature extraction operation on the pre-processed data, where the feature extraction operation is comprised in the machine learning process. In certain embodiments, the one or more data pre-processing operations comprise at least one of an outlier removal operation, a data clustering operation, or a kernel density estimation operation. In certain embodiments, the generating can further include retrieving the at least the portion of the data, where the at least the portion of the data is sample data in a sample window of the data.

In another embodiment, the comparing can include comparing one or more features of the new feature information and one or more features of the existing feature information. In certain embodiments, the comparing can include performing a distance determination operation. Such a distance determination operation can, in certain embodiments, include determining a distance between each feature of the new feature information and a feature of the existing feature information, where the new feature information is represented by a first probability density function, the existing feature information is represented by a second probability density function, and the distance is defined by a relative entropy between the first probability density function and the second probability density function.

In still other embodiments, the identifying can include determining a number of existing backup images to be prefetched and determining a backup identifier for each of one or more existing backup images to be prefetched, where the one or more existing backup images to be prefetched are identified by the result. In certain embodiments, the one or more existing backup images are prefetched prior to a deduplication operation being performed on the new backup image. In certain embodiments, the new feature information can include a mean value for a first feature, a covariance for the first feature, and sampled data for the first feature, and the existing feature information can include a mean value for a second feature, a covariance for the second feature, and sampled data for the second feature.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
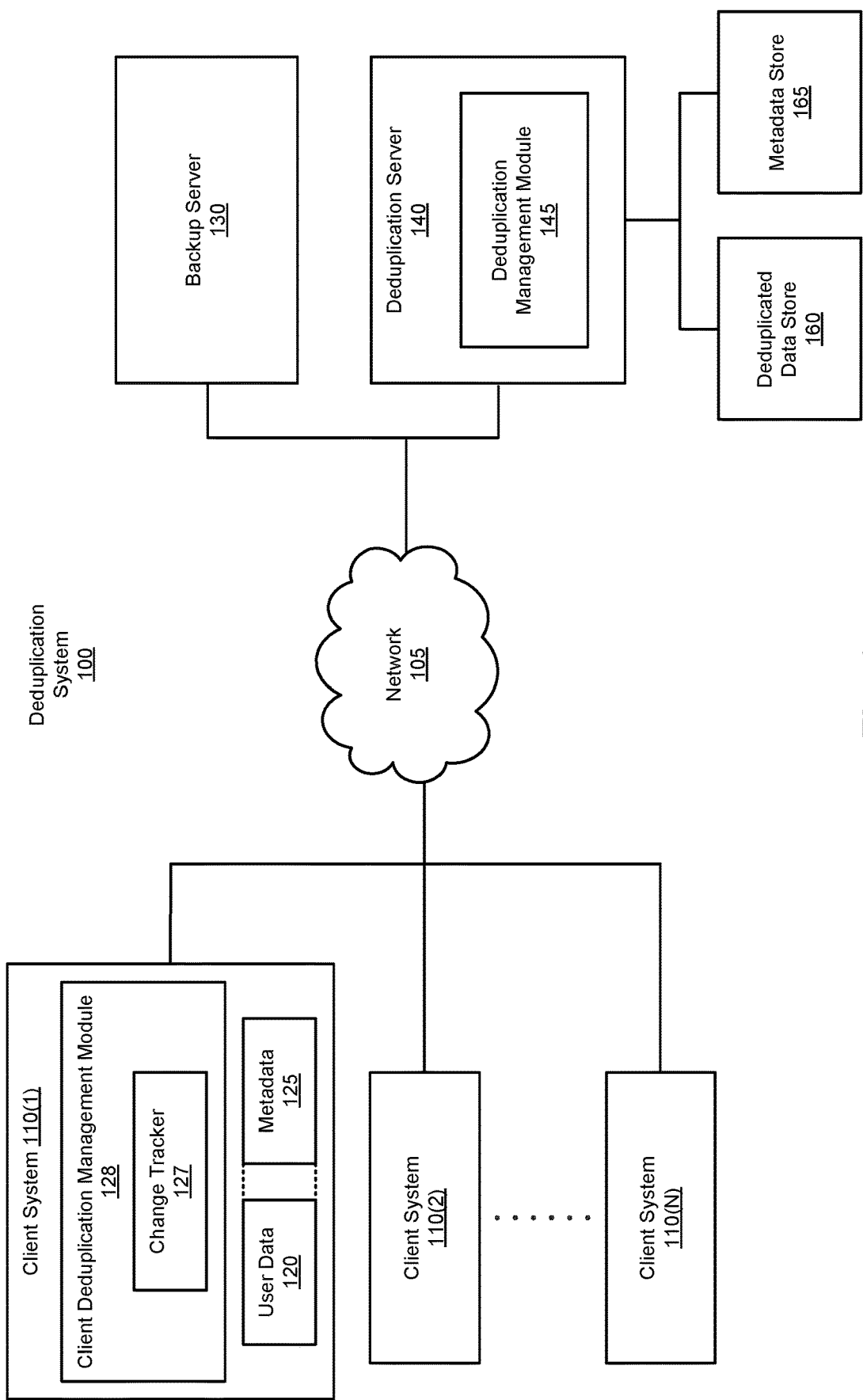
FIG. 1 is a simplified block diagram illustrating components of an example of a deduplication system, according to embodiments of methods and systems such as those disclosed herein.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Rather, any number of variations may fall within the scope of the disclosure, and as defined in the claims following the description.

While the methods and systems described herein are susceptible to various modifications and alternative forms, specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

INTRODUCTION

Methods and systems such as those described herein provide for improved performance in deduplication systems. Broadly, the concepts described herein are applicable to the backup of data, and more particularly, to methods and systems for improving performance in backup systems by way of providing improved deduplication performance (for example, deduplication rate) using prefetched backup information. More specifically, methods and systems such as those described herein provide flexible, efficient, and effective techniques for improved backup performance by employing machine learning techniques to analyze existing backup information, and use the results of such analysis to effect prefetching of one or more existing backup images that exhibit features that are sufficiently similar to those of a new backup image (or portion thereof) that is to be deduplicated.

In one embodiment, for example, such methods and systems employ machine learning techniques to generate one or more features of one or more existing backup images, as well as one or more features of a new backup image (or portion thereof). Such an embodiment can then determine a distance between the features of the new backup image and those of the existing backup images, and in so doing, facilitate the identification of one or more existing backup images that can be prefetched, in order to improve the performance of a deduplication operation performed on the new backup image.

As noted, certain aspects of present invention relate to deduplication systems that employ machine learning in the operation of a deduplication cache, providing improved deduplication performance (e.g., by way of improving such systems' deduplication rate). As also noted, deduplication techniques are used in backup systems to reduce storage usage for a given amount of data. Fingerprints of data segments are used to identify data duplicates. With backend storage becoming increasingly voluminous, it becomes increasingly difficult to maintain an ever-increasing number of fingerprints cached in a deduplication system's main memory. Identifying the information that should be cached in memory in order to achieve an advantageous deduplication rate is thus a focus of certain of these embodiments. For example, with a given backup policy, when a new client is added into the policy and a backup starts for the client, it is advantageous to properly identify the fingerprints that should be prefetched into such a cache, preferably using a dynamic approach, in order to provide an improved deduplication rate.

Certain embodiments provide for deduplication caching approaches employing machine learning (referred to herein as machine learning deduplication caching (MLDC)), which prefetches the proper backup images with sufficiently high similarity for deduplicating initial backups of newly added clients, based on, for example, identified backup behavior of historical backups. Certain deduplication systems employ a caching policy (e.g., a Least Recently Used (LRU) policy), but such approaches often exhibit a low deduplication rate when the backups in question do not have high temporality. Another caching policy, referred to as Locality Preserved Caching (LPC), can be implemented, but also suffers from certain infirmities. The LPC technique randomly prefetch is a subset of <fingerprint. DCID> pairs for deduplication first, then prefetch is fingerprints in the respective containers of the missed fingerprints. Such a technique does not provide acceptable performance for the initial backup that has low locality. Furthermore, such a technique can suffer from unacceptably high overhead, caused by an inordinately large amount of on-disk fetching (due to frequent prefetching misses).

In certain embodiments, then, an MLDC according to the methods and systems described herein includes three aspects: representation, learning, and decision making. The representation component provides an effective manner in which to model the backup behavior of each client/policy requiring low overhead, while providing MLDC systems with sufficient information. The learning component in such embodiments automatically learns the backup behavior of the historical backup workload of each client/policy by capturing the patterns and features from its fingerprint metadata. The learning component also estimates the backup behavior of a new backup images by analyzing the patterns from a portion of the patterns and features of the fingerprint metadata for a new backup image, in order to identify the backup behavior in question. The decision making component describes techniques for determining which backup images are to be prefetched by comparing the patterns and features of a new backup image (or portion thereof) and one or more existing backup images.

Representation

In one embodiment of an MLDC, the backup behavior of each client/policy is represented by its latest full backup's container usage, instead of the fingerprints generated. Such representation significantly reduces the complexity of the modeling of backup behavior. The container usage of a full image can be quantified as a table with data container ID (DCID, as noted subsequently) and a logical size, which specifies the size of fingerprints referenced. The container usage also can be visualized as a 2D scatter plot, where each data point depicts the logical size of fingerprints referenced by the DCID (e.g., in [DCID, logical size] pairs). A container usage data structure can store such information in a data structure identified by a client identifier, a policy identifier, time information, and type information.

Learning

As will be appreciated in light of the present disclosure, container usage of a (full) backup image is not randomly distributed, typically, but rather, clustered into one or more groups. Such a finding indicates that the container usage for a given backup image has relatively high locality, in terms of DCID. A machine learning approach (referred to herein as Container Usage Pattern Mining (CUPM), as might be effected by a container usage pattern analyzer (CUPA)) automatically identifies container locality and captures the features of the backup image's data.

CUPM techniques can be used to apply a data clustering algorithm to cluster the data based on the locality. For example, a density-based clustering algorithm such as density-based spatial clustering of applications with noise (DBSCAN) can be employed. Such clustering can be represented using mean values of each clustered data, while the mean value of outliers can be used to filter out such outlying data points. The outliers are typically irregularly small or large files, or files saved in isolated containers, and lack the representative weight of a pattern, and so are filtered out. CUPM can be used to automatically detect and remove such outliers, thereby enhancing the quality of the data analyzed by the MLDC.

After outlier removal and grouping of the data, CUPM can include the application of a statistical hypothesis test (e.g., a Chi-square analysis) and/or a density estimation technique (e.g., Kernel Density Estimation (KDE)) to perform learning for a generative model for each cluster of data. In one embodiment, Chi-square can be employed to select a probability density distribution that fits the clustered data, then KDE can be used to learn the features (e.g., such as mean, covariance, and bandwidth) of the selected distribution. In certain embodiments, such mean values, covariances, and sampled data from the patterns of the existing backup images are obtained by the CUPA system using the aforementioned CUPM techniques in an offline setting. More generally, in such embodiments, the feature information can also include a probability model, thus such feature information can include information such as:

Probability model (e.g., a Gaussian model, Pareto model, or the like);
Parameters of the model (e.g., mean and covariance); and
Sampled data.

Hence, the backup behavior of a given backup image (e.g., single full backup image) can be mathematically quantified as a sequence of generative models, $G_1$, $G_2$, $G_3$, . . . CUPM can be used to automatically determine the number of generative models sufficient to represent the container usage of the backup image.

In practice, CUPM can be applied to the deduplication pool for training backup behavior generative models on latest historical full backups of each client. In order to reducing the impact on the regular backup, the training process can be executed offline, then learned models for MLDC decision making saved. Periodic training can be implemented to update the learning models of the deduplication pool (e.g., on a weekly or monthly basis).

Decision Making

An MLDC according to methods and systems described herein is intended to improve the deduplication efficiency of newly-added clients by prefetching backup images (e.g., full images) with sufficiently-high similarity in terms of the container usage. For the backup created by a new client, information regarding what might be expected, in terms of data within the new backup image, is too limited at the beginning of the backup process. MLDC can identify the characteristics of the backup behavior through the limited information, for example, by randomly prefetching images from the same policy. When more information regarding container usage is collected, as the backup process ongoing, MLDC applies CUPM to estimate the backup behavior of the backup. MLDC can then calculate the generative model distances between the new backup and the trained historical images introduced in learning operations, and save such information in, for example, a distance list. The backup images with shortest distance to the new backup image are prefetched, thereby improving deduplication performance (e.g., deduplication rate). Examples as to the amounts of data to provide acceptable accuracy when performing MLDC prefetch in certain embodiments is described subsequently.

An example of an implementation of MLDC on a media server deduplication pool (MSDP) is described in connection with FIGS. 6, 7, and 8, subsequently. As will be discussed, a fingerprint catalog is maintained to store (or otherwise maintain) fingerprints of clients' latest backups. A CUPM technique is periodically applied to the fingerprint catalog, in order to identify and learn the patterns and features of historical backups. When a new backup of a newly added client is scheduled, the container usage of a small fraction (e.g., 5%) of the new backup is obtained by indexing the fingerprints in the same policy from the fingerprint catalog. The learning patterns and features of such a fraction of data are acquired by using such a CUPM technique. The distances between the initial backup and the historical backups are measured by calculating the relative entropy between the probability density functions of their learning patterns/generative models.

Example Deduplication Architecture

In general terms, data deduplication is a technique for reducing the amount of storage needed to store information by dividing such information into chunks and eliminating duplicates thereof. In the deduplication of data backups, such chunks are referred to as data segments. Such data segments can be identified by a sufficiently-unique identifier of the given data segment (the sufficiency of the identifier's uniqueness being an acceptably low probability of unique data segments mapping to the same identifier). As will also be appreciated, such fingerprints can be generated by, for example, a fingerprinting algorithm, which is an algorithm that maps a data segment to a smaller data structure (e.g., of shorter length), referred to generically herein as a fingerprint. A fingerprint uniquely identifies the data segment and is typically used to avoid the transmission and comparison of the more voluminous data that such a fingerprint represents. For example, a computing system can check whether a file has been modified, by fetching only the file's fingerprint and comparing the fetched fingerprint with an existing copy. That being the case, such fingerprinting techniques can be used for data deduplication, by making a determination as to whether a given unit of data (e.g., a file, portion there of (e.g., a data segment), or the like) has already been stored. An example of a fingerprint is a hash value. Hashing algorithms such as Message-Digest Algorithm 5 (MD5), Secure Hash Algorithm 1 (SHA-1), and Secure Hash Algorithm 256 (SHA-256) and the like can be used to generate hash values for use as fingerprints.

The function of a hashing algorithm is a function that can be used to map original data of (what can be arbitrary) size onto data of a fixed size, and in so doing, produce a value (a hash value) that is unique (with a sufficiently high level of confidence) to the original data. The input data is typically referred to as the "message" and the hash value is typically referred to as the "message digest" or simply "digest."

During a backup, clients and/or other computing systems may present duplicate data within a set of data that is to be backed up. In addition, if a set of data is backed up multiple times, the data that is unchanged also results in duplicates of previously backed up data. In order to prevent backing up duplicate data from one or more clients, backup systems can implement deduplication, which removes duplicate copies of data while keeping track of how the stored unique data is being referenced. Deduplication can be used not only to preserve storage space when backing up data from client systems, but also avoids the unnecessary transfer of duplicate data.

As will also be appreciated, hardware failure is not an entirely uncommon event in today's information processing systems. Also not infrequently, the cause of such hardware failures is related to the storage systems in which such information is maintained. In light of such challenges, data protection has always been, and indeed, continues to be an important consideration in the reliable operation of such information processing systems. Traditionally, for online/operational data, different technologies (e.g., redundant array of independent disks (RAID) storage systems or mirroring/replication storage systems) have been employed to provide fault tolerance. Mirroring provides one or more full redundant copies of the data being protected, with virtually no performance impact, but suffers from a significant increase in storage consumption. Alternatives to mirroring include various levels of RAID storage systems (e.g., RAID4, RAID5, RAID6, and the like), which provide fault tolerance to a degree that is similar to that provided by mirroring storage systems.

FIG. 1 is a simplified block diagram illustrating components of an example of a deduplication system (depicted, for example, as a deduplication system 100), in which the present disclosure can be implemented. Deduplication system 100 includes a network 105 that communicatively couples one or more client systems 110(1)-(N), a backup server 130, and deduplication server 140 (includes a deduplication management module 145). Each component is discussed in further detail below.

One or more client systems 110(1)-(N), also referred to herein as client devices 110 and/or client systems 110, can be implemented using, for example, a desktop computer, a laptop computer, a workstation, a server, or the like. An example of such computing devices is described subsequently. One or more client systems 110(1)-(N) can be configured to communicate with backup server 130 and deduplication server 140 via network 105. An example of network 105, which can be used by client systems 110 to access backup server 130 and deduplication server 140, is a local area network (LAN) utilizing Ethernet, IEEE 802.11x, or some other communications protocol. While FIG. 1 illustrates client system 110(1) including user data 120 and metadata 125 (and such being associated with one another, by dotted lines), each client system can store different user data 120 and metadata 125 in storage local to the client system.

Also shown as being implemented in client system 110(1) is a change tracker (illustrated in FIG. 1 as a change tracker 127). Change tracker 127 can be implemented, for example, as part of a client deduplication management module (illustrated in FIG. 1 as a client deduplication management module 128). Moreover, change tracker 127 can be implemented, for example, as a change block tracker, detecting data (e.g., data blocks) written by, for example, an application executed by client system 110(1). Such a change block tracker can track units of storage (e.g., disk sectors, data blocks, or the like) that have been changed, for example, by the aforementioned application. Such a list of changed units of storage is referred to herein as a data object change tracking list, or more specifically, a file change tracking list (and more generically as a change tracking stream). Once identified, such changed units of storage can be transferred from the computing system in question to a backup server (e.g., backup server 130) or a deduplication server (e.g., such as deduplication server 140), for example. In certain embodiments, such changed units of storage can be sent to a proxy server, for further conveyance to the proper destination, then or at a later time. As will be appreciated in light of the present disclosure, such an implementation is presented merely as an example, and such change tracking can be performed by any computing device shown in FIG. 1 (e.g., by deduplication server 140) and/or another computing device not shown in FIG. 1.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of the user data 120 may also be transferred to backup server 130 and/or deduplication server 140 via a network 105 to be included in deduplicated data store 160, and the associated metadata (e.g., metadata 125). Each of client systems 110 can send different user data and metadata to backup server 130 and/or deduplication server 140.

Metadata 125 can include data about the user data 120. Metadata 125 can be generated by client system 110(1), such as during a backup process. Whenever a user (e.g., an application or human user) requests that client system 110 add all or part of user data 120 to the deduplicated data store 160 (e.g., as part of a regularly scheduled full or partial backup of the client system), client system 110(1) can read user data 120 and metadata 125 (or generate metadata 125 about user data 120), such as one or more identifiers (also referred to herein as signatures), that can identify different portions of user data 120. Client system 110 can provide metadata 125 as a list (e.g., a list of signatures) to deduplication server 140. Metadata 125 can be used by deduplication server 140 to determine whether a portion of user data 120 is not already stored in deduplicated data store 160 (and so should be added to the deduplicated data store 160).

As noted, backup server 130 is also coupled to network 105. Backup server 130 can include one or more physical servers configured to perform a variety of tasks related to management and implementation of backup services for deduplication system 100, such as performing a full or partial backup of a client system. In deduplication system 100, backup server 130 is further configured to communicate with deduplication server 140 for purposes of storing backups of data from client systems 110(1)-(N) in resources controlled by deduplication server 140. Such communication can be via network 105 or via a direct link between the backup server 130 and deduplication server 140. Information that can be provided by backup server 130 to deduplication server 140 can include a unique identification associated with each data stream provided by one of client systems 110(1)-(N) to the deduplication server 140. The backup server 130 can also provide sequence number identification for to identify sequential data transmitted in each uniquely identified data stream. Deduplication server 140 (and more particularly, deduplication management module 145) can then use such information to associate received data streams from client systems 110(1)-(N) in accord with embodiments of the present invention, as further discussed subsequently.

Backup services can be implemented in deduplication system 100 as a client-server application (not shown), with a server component (e.g., residing in backup server 130) and a client component (e.g., residing on client systems 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks on the clients, maintaining databases related to files and other information backed up from file systems associated with the clients, and managing or tracking resources storing backups of client systems 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services, which can be managed by deduplication management module 145. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Such storage can be managed by deduplication management module 145. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client systems 110) of the client-server application. For example, during a backup process for storing a backup of user data 120 in deduplicated data store 160, a client component of the deduplication services can be configured to generate metadata 125 about user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is in turn coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in deduplication system 100 will be stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that includes various metadata regarding the deduplicated data stored in deduplicated data store 160, such as information regarding backup images stored in deduplicated data store 160 (also referred to herein as a catalog), including, in certain embodiments, references to the files included in a given backup. It is these references (e.g., file references) to which methods and systems such as those described herein are directed, with regard to improving the efficiency with which such references are managed. That being the case, metadata store 165 is configured with data constructs and structures, such as those described subsequently herein, in order to facilitate performance of processes such as those also described subsequently herein.

The various metadata (including metadata 125) can be stored in, among other locations, a central index. For example, deduplication server 140 can use metadata 125, such as the list of signatures from client systems 110, to determine if portions of a backup image (e.g., portions of user data 120) are non-duplicative of portions already stored in deduplicated data store 160. Once deduplication server 140 determines that a portion of user data 120 is not duplicative of the data already stored in deduplicated data store 160 and thus should be added to the deduplicated data store 160, deduplication server 140 can store a corresponding identifier, or signature, of the portion of user data 120 in the central index. Deduplication server can request the non-duplicative portions (or unique portions) from client systems 110 by identifying the unique portion with the portion's associated signature.

As the unique portions are received via a data stream from client systems 110, the unique portions can be written into a fixed-size container (e.g., also referred to herein as a container file, and includes these and/or other storage construct) stored at deduplication server 140, such as in a cache or other storage unit. Once the container is full of unique data segments, in certain embodiments, the entire container can be written to a location in deduplicated data store 160. The container written to the deduplicated data store 160 can also include a local container index, which indicates a local location of each unique portion stored within the container. The local container index can include a signature associated with each unique segment stored in the container, or alternatively can include a shortened version of the signature of each unique segment stored in the container. Deduplication server 140 can maintain information identifying a container (e.g., a container identifier (a "container ID") of the container, also referred to as a data container identifier (DCID)) in a central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backup images can be stored in the deduplicated data store 160. For example, a first backup image can be captured from user data 120 and can be stored in deduplicated data store 160. A subsequent backup image captured from user data 120 can include duplicate portions that are identical to portions of the first backup image already stored in deduplicated data store 160 and can include unique portions that are not identical to portions of the first backup image (e.g., portions that correspond to changed user data 120). The unique portions of the subsequent backup image can be written to deduplicated data store 160, while the duplicate portions will not be written (since the duplicate portions are identical to instances of portions already stored in deduplicated data store 160). Since only single instances of portions of a backup image are stored in deduplicated data store 160, metadata store 165 can provide a mapping of a backup image to the various non-duplicative portions stored in deduplicated data store 160 that compose the backup image. Thus, a single backup image can be associated with multiple portions stored throughout the deduplicated data store 160, and multiple backup images can be associated with a single portion (e.g., the multiple backup images share the single portion). For example, the subsequent backup image can be associated with unique portions of the subsequent backup image that were written to deduplicated data store 160 and with unique portions of the first backup image that were previously written to the deduplicated data store 160. Metadata store 165 can store associations between a backup image and the portions that compose the backup image as a group of references or pointers, where each reference indicates an entry of the central index that corresponds to a portion included in the backup image.

As additional backup images are added to deduplicated data store 160, backup image data can become fragmented across deduplicated data store 160 as portions of changed user data 120 are stored. Thus, a recent backup image stored in deduplicated data store 160 may include portions of recently changed user data 120 contiguously located in deduplicated data store 160, and may include multiple references to previously changed user data associated with older backup images, which are stored in various non-contiguous locations throughout deduplicated data store 160. If a user were to restore the recent backup image from deduplicated data store 160, deduplication server 140 would have to read numerous portions of data associated with older backup images from across the various locations (e.g., various containers) in deduplicated data store 160. Thus, as a backup image becomes more fragmented, restoration of the backup image can become more inefficient due to the increasing amount of time spent on performing a growing number of access operations needed to read each portion of data of the backup image from various locations in deduplicated data store 160 (e.g., determining a location for each of the multiple portions from metadata store 165).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's operating system (OS), for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), SSD and/or FLASH memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, client systems 110 can be directly coupled to deduplicated data store 160 and/or metadata store 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2A:
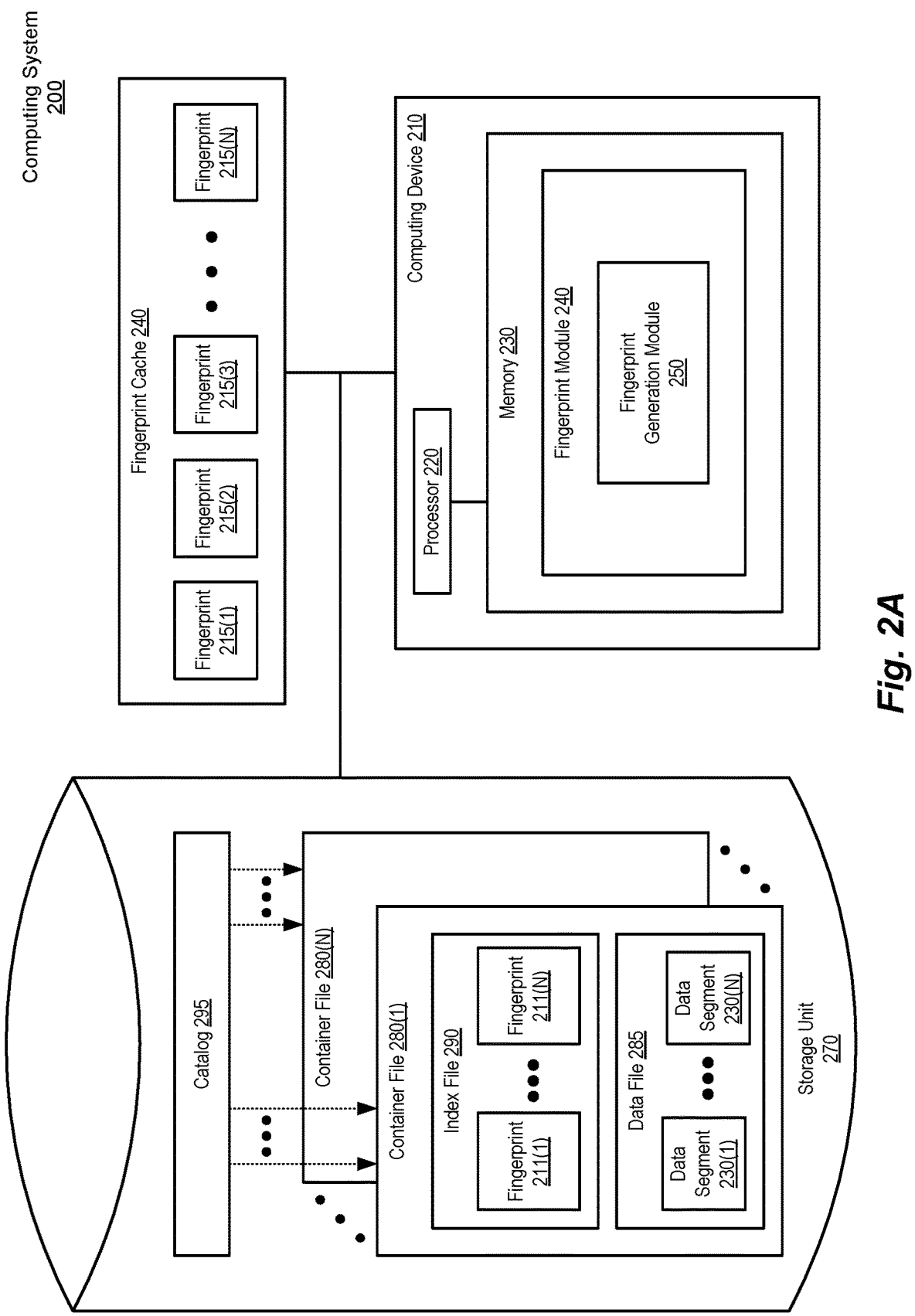
FIG. 2A is a simplified block diagram illustrating components of a computing system supporting deduplication, according to embodiments of methods and systems such as those disclosed herein.
Figure 2B:
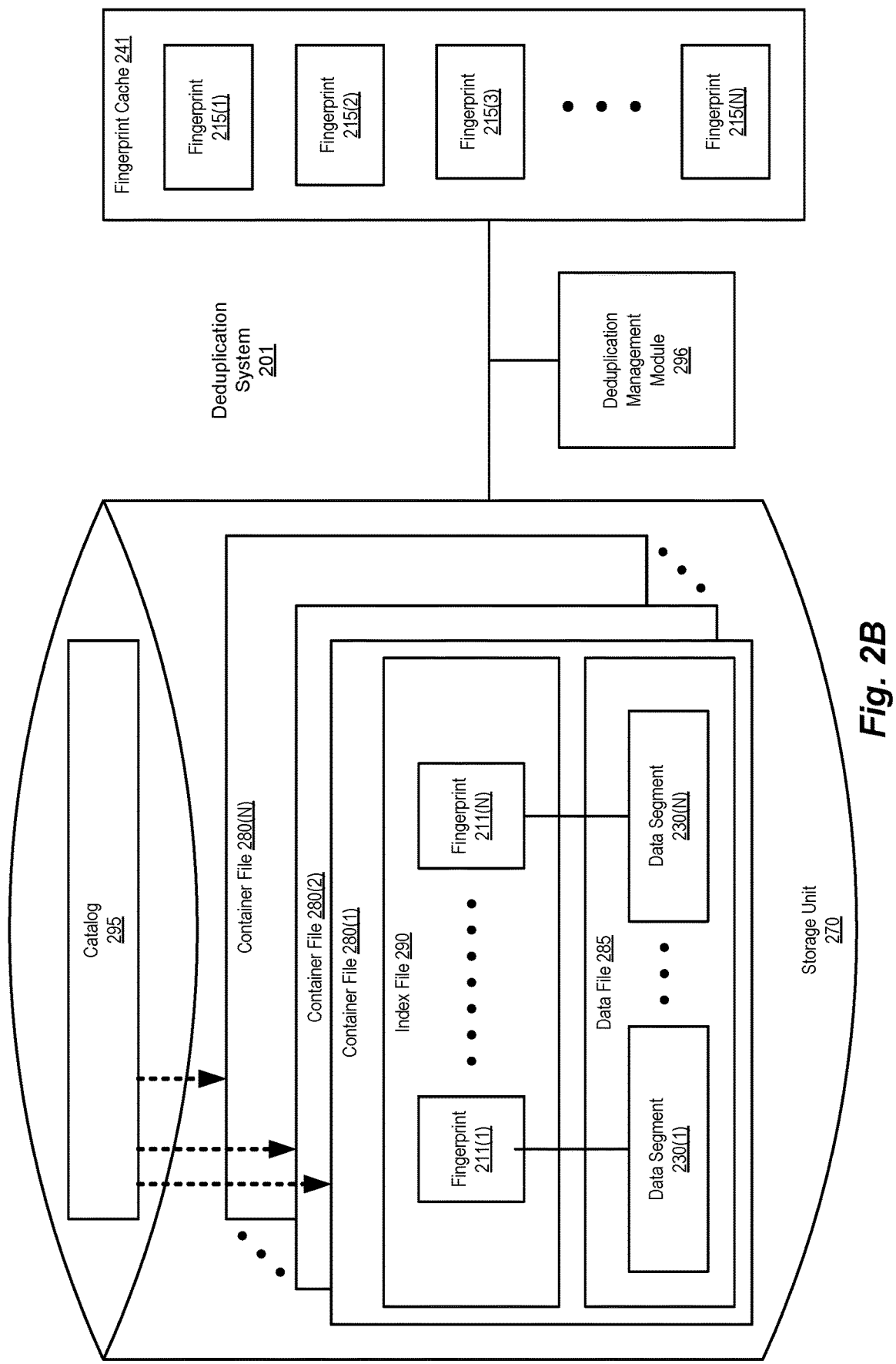
FIG. 2B is a block diagram of a computing system that stores multiple fingerprints and their associated data segments in a container file, according to embodiments of methods and systems such as those disclosed herein.

FIG. 2A is a block diagram of a computing system (which can be a client computing system or a server computing system, and which is depicted in FIG. 2A as a computing system 200; a deduplication system 201 is therefore depicted in FIG. 2B). Computing system 200 includes a computing device 210, a storage unit 270, and a fingerprint cache 240. As will be appreciated in light of the present disclosure, a fingerprint cache such as fingerprint cache 240, in certain embodiments, facilitates a determination as to whether data represented by a given fingerprint is stored in the system, as well as facilitating the identification of the container file in which the data in question (i.e., that represented by the given fingerprint) is stored. As shown, computing device 210 is communicatively coupled to storage unit 270 and fingerprint cache 240. Computing device 210 can be implemented using one or more of a variety of different types of computing devices, including a server, personal computing device, laptop computer, net book, personal digital assistant, cellular phone, or the like. It is noted that this is a simplified example, and that other embodiments can include far more complex organizational and configuration schemes than are shown here.

Computing device 210 includes a processor 220, and memory 230. Computing device 210 also includes a fingerprint module 240 which implements a fingerprint generation module 250. Fingerprint generation module 250 generates new fingerprints for a given data segment by implementing, for example, a fingerprint generation routine that generates a hash value corresponding to the given data segment. In this example, fingerprint generation module 250 implements a routine that uses a fingerprinting algorithm to generate a fingerprint (hash value).

Storage unit 270 stores a number of container files (e.g., such as one of container files 280(1)-(N), referred to herein for the sake of simplicity as container file 280, as an example of a container file and/or other such storage constructs) which includes a data file 285 and an index file 290. In this example, index file 290 stores fingerprints (e.g., fingerprints 211(1)-(N)) and data file 285 stores data segments (e.g., data segments 230(1)-(N)). Fingerprint cache 240 is a dedicated cache for storing fingerprints (depicted in FIG. 2A as fingerprints 215(1)-(N)). As will be appreciated in light of the present disclosure, the fingerprints stored in fingerprint cache 240 can represent data objects generally (e.g., data storage constructs such as files and the like).

Computing device 210 is coupled to storage unit 270. In this example, storage 270 stores container file 280, but can also store data (not shown) in addition to container file 280, and can do so using other formats. Storage 270 can be a persistent storage device and can include one or more of a variety of different storage devices, including hard disks, compact discs, digital versatile discs, solid state drives (SSDs; e.g., FLASH memory), and the like, or one or more logical storage devices such as volumes implemented on one or more such physical storage devices.

Computing device 210 is also coupled to a fingerprint cache 240. In this example, fingerprint cache 240 can be main memory, an SSD, or even a file, and implements a cache such that data (e.g., frequently accessed fingerprints) can be served to computing device 210 in an expeditious manner to determine the existence of a given fingerprint and where the data represented by that fingerprint is stored, versus, for example, from a slower storage device (e.g., a hard disk drive (HDD)). However, fingerprint cache 240 can be implemented on one or more of a variety of different storage devices, including hard disks, compact discs, digital versatile discs, and the like, or on one or more logical storage devices such as volumes implemented on one or more such physical storage devices.

Computing device 210, storage unit 270, and fingerprint cache 240 can be integrated (e.g., where the storage device is coupled to the node's internal processing devices by an internal bus and is built within the same chassis as the rest of the node) or separate. If separate, computing device 210, storage unit 270, and fingerprint cache 240 can be coupled by a local connection or via one or more networks (e.g., local area networks (LANs) and/or wide area networks (WANs) (not shown)).

FIG. 2B is a block diagram of a computing system that stores multiple fingerprints and their associated data segments in a container file. In such a deduplication backup system (depicted in FIG. 2B as deduplication system 201), data storage constructs such as data segments (e.g., data segments 230(1)-(N)) are depicted as being stored in a data file (e.g., such as data file 285) of container file 280(1). Each container file includes an index file (e.g., such as index file 290) and a data file (e.g., such as data file 285). In this example, index file 290 stores fingerprints 211(1)-(N) and data file 285 stores data segments 230(1)-(N). In the embodiment depicted in FIG. 2B, each of fingerprints 211(1)-(N) corresponds to a corresponding one of data segments 230(1)-(N). Also as shown in FIG. 2B, fingerprint cache 241 stores fingerprints 215(1)-(N). For example, after data segments and their associated fingerprints are stored in a container file 280, fingerprint cache 241 can be maintained to indicate that the data segment in question is stored in a container file 280 (and so is a duplicate).

As before, fingerprints 215(1)-(N) represents data storage constructs generally (e.g., the aforementioned data segments, and/or files or the like). In a deduplication backup systems that implement fingerprints, an index file can be employed to separately record fingerprint information, data segment location, and data segment size for each unique fingerprint associated with a data segment (e.g., <fp1, size1, offset1>, <fp2, size2, offset2>, and so on, as described, for example, in connection with FIG. 3B, subsequently). Also, the index file may include other information about the data segments, including (but not limited to) information indicating whether the data segment is compressed, encrypted, and/or has other such characteristics that may need to be taken into account when accessing that data segment.

Deduplication system 201 can include, for example, a deduplication management module 296 to manage various of the aforementioned information. For example, deduplication management module 296 can manage insertion of fingerprints in index file 290, data segments in data file 285, storage of fingerprints in fingerprint cache 241, and references and other information in catalog 295. Further in this regard, deduplication management module 296 can perform or cause to be performed deduplication management operations such as those described elsewhere herein.

Figures 3A, 3B:
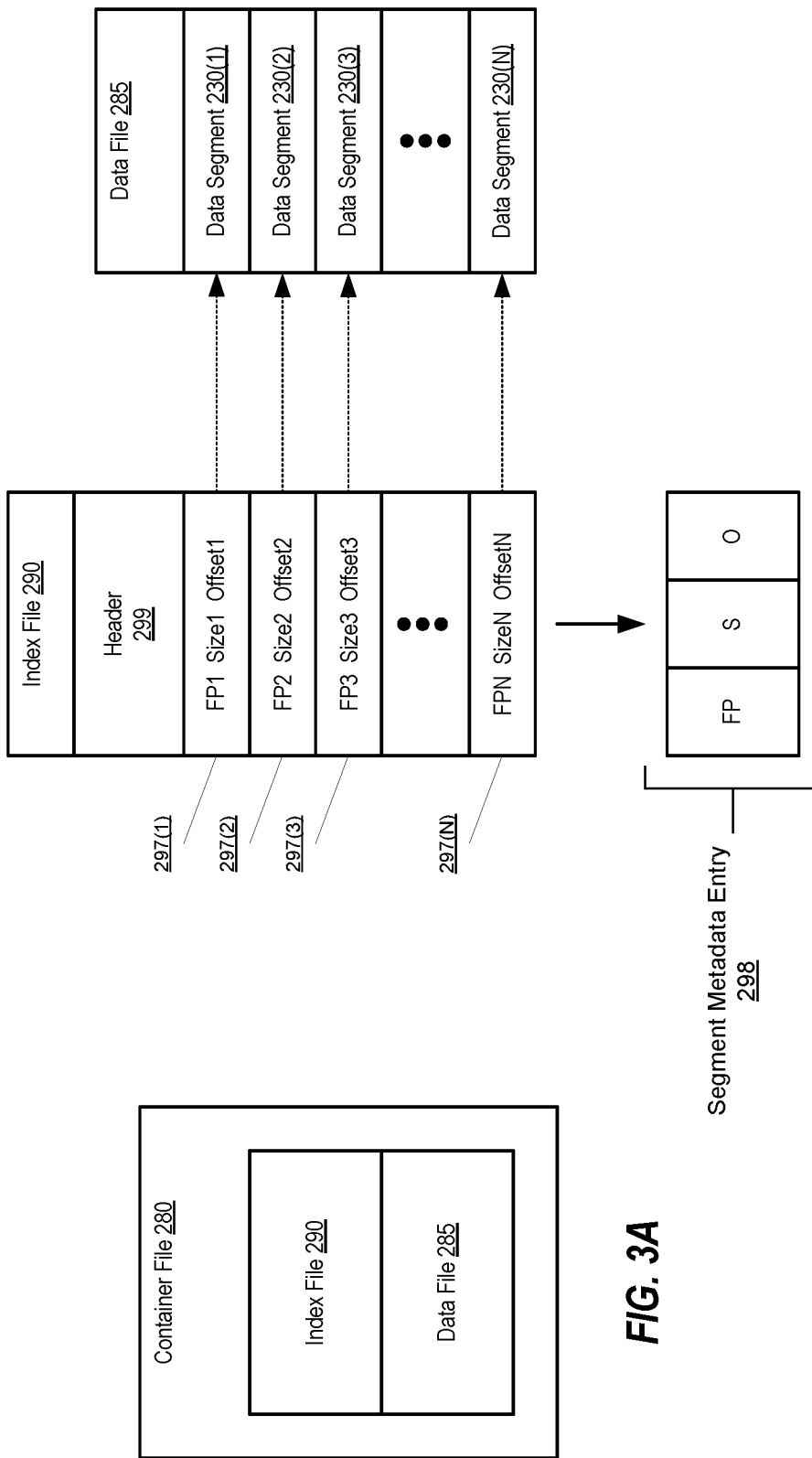
FIG. 3A is a simplified block diagram illustrating an example of the composition of a container file, according to embodiments of methods and systems such as those disclosed herein.
FIG. 3B is a simplified block diagram illustrating an example of the composition of index file, according to embodiments of methods and systems such as those disclosed herein.

FIG. 3A is a simplified block diagram illustrating an example of the composition of container file 280, which, according to one or more embodiments, allows a backup operation to reference multiple fingerprints representing the data segments that make up a given data construct, such as a file. At the beginning of an initial backup operation, new data segments are written into the given container files (e.g., a container such as container file 280). At the end of the initial backup operation, a data object is stored in the newly-created container file. The data object can contain, for example, the following information: <fp1, size1, containerID1>, <fp2, size2, containerID2>, and so on. A data object typically corresponds to a backup image that includes the data segments to be backed up during a full or incremental backup operation. As will be also appreciated in light of the present disclosure, a data object may be represented by a fingerprint that is the hash value of the data object content.

According to one embodiment, at the beginning of a backup operation from the same client and/or backup policy that performed and/or requested the initial backup operation, data objects that include fingerprints of the last full backup operation (in this example, the initial backup operation) can be retrieved from container file 280. Data segments (or other data storage constructs, as noted) in the new backup operation are fingerprinted (e.g., using fingerprint generation module 250) and looked up within fingerprints from the last full backup operation (e.g., fingerprints 215(1)-(N) in fingerprint cache 240).

If a given fingerprint is not among fingerprints 215(1)-(N) in fingerprint cache 240, a "cache miss" has occurred, and such as indicated (thereby indicating that one or more fingerprints thus generated were not present in the last full backup operation). That being the case, such fingerprints are looked up in a fingerprint index cache, which, in certain embodiments, is a centralized fingerprint index cache such as that depicted in connection with FIG. 2B. In certain embodiments, if the fingerprints are not found in such a central fingerprint index cache, the fingerprints are inserted into the central fingerprint index cache. Future backup operations can then reference fingerprints from both the last full backup operation (e.g., an initial backup operation) and the new backup operation.

In some embodiments, such a central fingerprint index cache is maintained by a deduplication server. In such a scenario, the central fingerprint index cache includes at least part of the entire set of fingerprints that exist in the deduplication system and includes fingerprints generated by a fingerprinting algorithm such as that described previously herein. Although future backup operations can reference fingerprints from the previous backup operations, the central fingerprint index cache will typically not maintain copies of all the fingerprints making up fingerprints 215(1)-(N) because, in this example, fingerprint cache 240 is implemented on an SSD. While such an implementation provides faster fingerprint retrieval and lookup functions, such a storage technology does not typically provide enough storage to store all the fingerprints associated with the various data segments in the previous backups. Therefore, index file 290 is needed, to ensure that future backup operations can reference index file 290 (rather than having to store all such fingerprints in fingerprint cache 240).

FIG. 3B is a simplified block diagram illustrating an example of the composition of index file 290 and data file 285, according to one or more embodiments. That being the case, index file 290 can be seen to include a number of metadata entries (depicted in FIG. 3B as metadata entries 297(1)-(N), and referred to in the aggregate as metadata entries 297), which, in turn, include: <FP1, size1, offset1>, <FP2, size2, offset2>, and so on, where FP1 represents fingerprint 211(1), FP2 represents fingerprint 211(2), and so on. Metadata entries 297 are shown in an example as a segment metadata entry 298, which includes a fingerprint, a data segment size, and a data segment offset within data file 285. While metadata entries 297 are depicted as including such information, additional information (e.g., compression/encryption flags, a checksum, other data references, and/or other relevant information pertinent to the data stored in data file 285). Index file 290 also includes a header 299, which can be used to maintain information regarding the aforementioned metadata entries. As is shown in FIG. 3B, the size and offset information, associated with each of the fingerprints, serves as an index to a data segment in data file 285 to which the given fingerprint corresponds.

In some embodiments, index file 290 includes a number of data object records, each of which may include, in addition to the foregoing, a unique identifier (UID) list, which may list one or more UIDs of file records in catalog 295, as described subsequently in connection with FIG. 4. When a file's data is to be inserted in the catalog (e.g., as part of a backup operation), a file record is created with a UID for the file and fingerprint for the data of the file. In such embodiments, the given UID can be inserted into the data object record that has the data fingerprint in question (i.e., the fingerprint of the data object storing some or all of the file data of the inserted file). When a file record is removed (e.g., in response to a request from a source computer), the UID of that file record is also removed from the corresponding data object record. Thus, in such embodiments, the UID list of a data object record uniquely identifies each file to which file data corresponds.

Figure 3C:
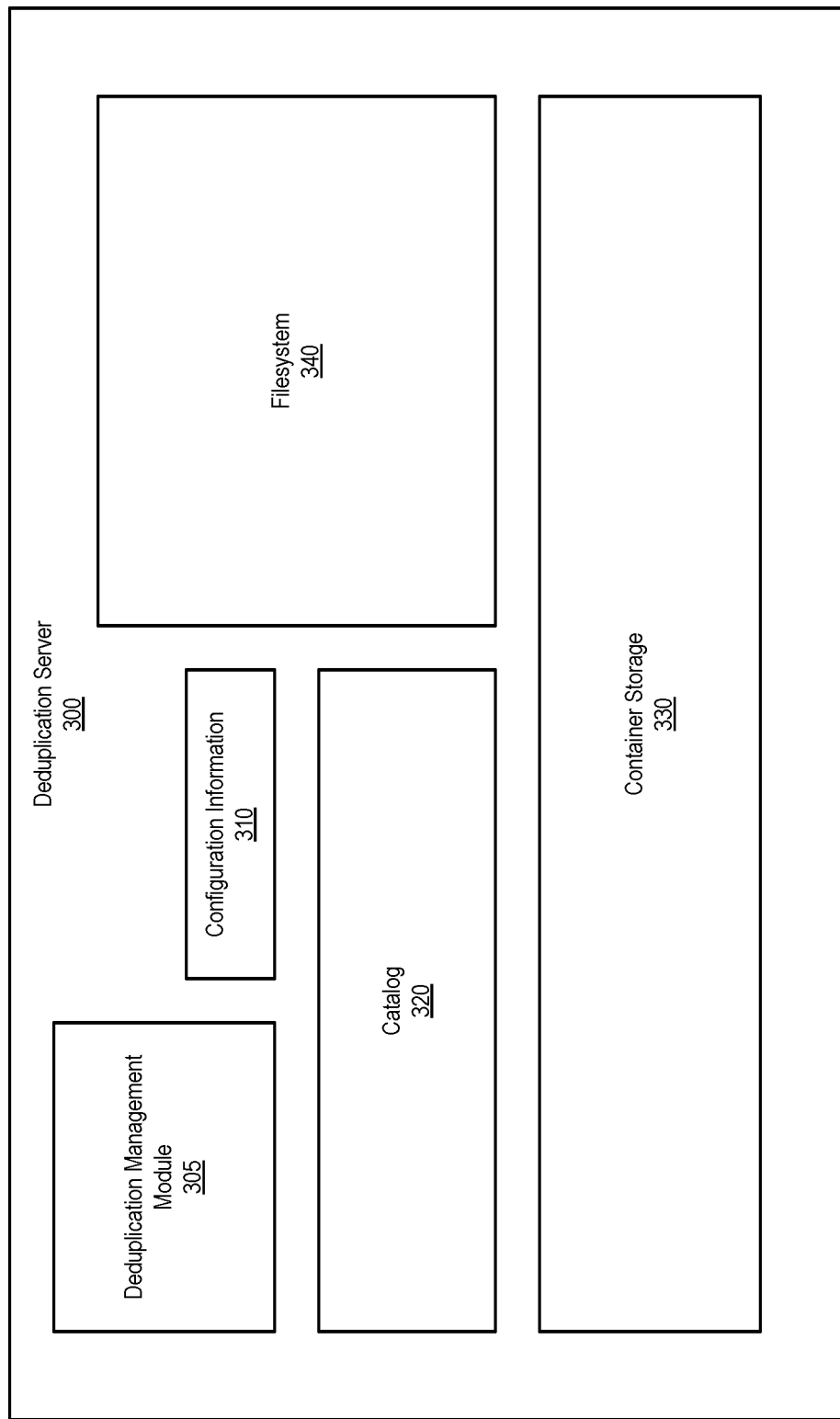
FIG. 3C is a simplified block diagram illustrating an example of a deduplication system, according to embodiments of methods and systems such as those disclosed herein.

FIG. 3C is a simplified block diagram illustrating an example of a deduplication system that provides a user-accessible storage area, according to methods and systems such as those described herein. That being the case, FIG. 3C depicts one embodiment of a deduplication server 300, in the manner of deduplication server 140 of FIG. 1. Deduplication server 300 includes a deduplication management module 305 (e.g., in the manner of deduplication management module 296, described earlier in connection with FIG. 2B), which manages and maintains a variety of information, including, in the depicted embodiment, configuration information 310, catalog information 320 (in the manner of catalog 295 described previously), and container storage 330 (in the manner of containers 280 described previously). In the embodiment depicted in FIG. 3C, deduplication server 300 also supports a file system 340. Despite existing in the storage of deduplication server 300, file system 340 can be accessed from other computing systems (e.g., client systems 110), by users of such other computing systems, in the manner of file systems local to those computing systems. Such can be accomplished using, for example, protocols such as NETWORK FILE SYSTEM (NFS), SERVER MESSAGE BLOCK (SMB), COMMON INTERNET FILE SYSTEM (CIFS), or the like.

Figure 4:
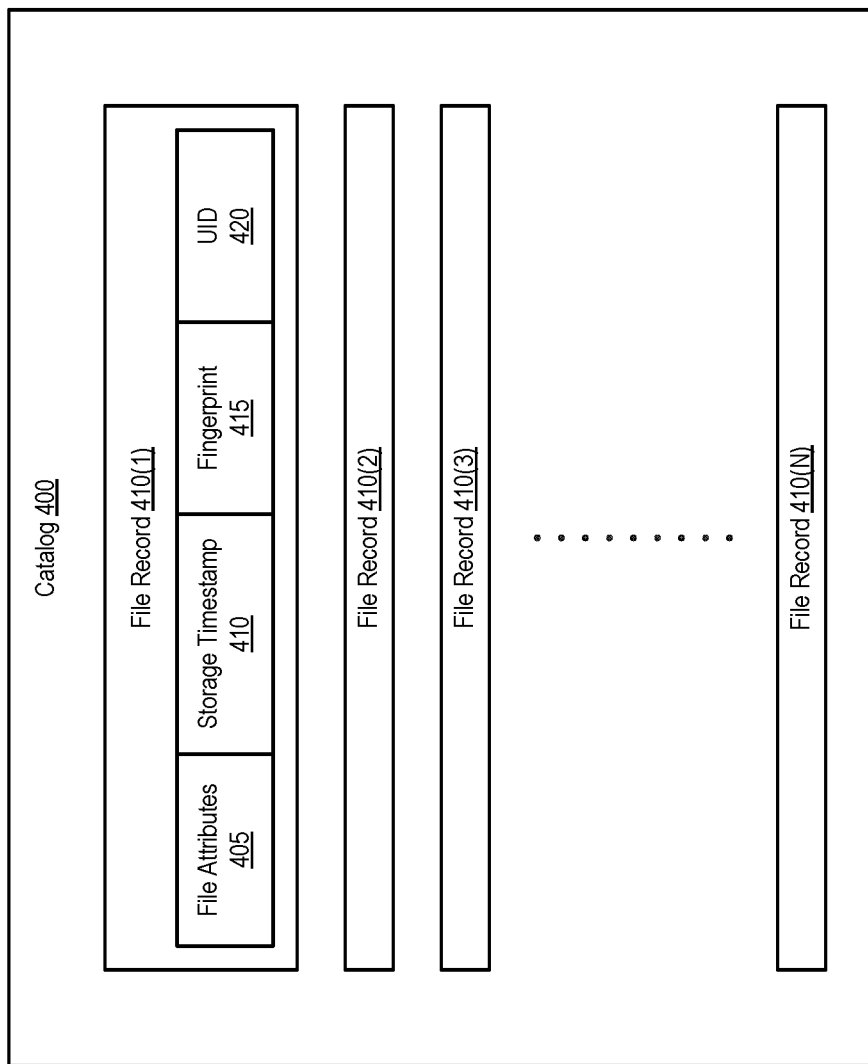
FIG. 4 is a simplified block diagram illustrating an example of a file record, according to embodiments of methods and systems such as those disclosed herein.

FIG. 4 is a simplified block diagram illustrating an example of a catalog, according to embodiments of methods and systems such as those disclosed herein. According to the illustrated embodiment, one or more file records can be stored in a catalog such as catalog 295 (a comparable construct being illustrated in FIG. 4 as a catalog 400), and is illustrated in FIG. 4 as being among a number of such file records (depicted in FIG. 4 as file records 410(1)-(N), or in their entirety, as file records 410). Using file record 410(1) as an example, it can be seen that FIG. 4 depicts file record 410(1) as including one or more file attributes 405, a storage timestamp 410, a fingerprint 415, and a unique identifier (UID) 420. In various embodiments, a file record may include fewer and/or additional details and/or various other pieces of information.

In certain embodiments, file attributes 405 includes a number of attributes of the corresponding file (e.g., filename, path, size, owner, modification/access history, permissions, and so on, as relates to the file in question). Storage timestamp 410 may include an indication of when the file record was created or last updated, for example. In certain embodiments, data fingerprint 415 includes fingerprint information that effectively uniquely identifies the data in the corresponding file, such that two files with the same data portion will have the same data fingerprint and two files with different data portions will have different fingerprints. For example, the data fingerprint may be derived by applying one or more hash functions to the data portion of the corresponding file, as noted earlier. Various other methods for calculating data fingerprints can be used to calculate data fingerprints, as also noted earlier. According to the illustrated embodiment, file record 410(1) also includes unique identifier (UID) 420 for the corresponding file. UID 420 may uniquely identify the file corresponding to file record 410(1) using various techniques, including those described in connection with the generation of fingerprints such as those associated with the data segments described elsewhere herein. In certain embodiments, catalog 400 includes a path object (PO, as noted) corresponding to each data object group in the catalog.

Figure 5:
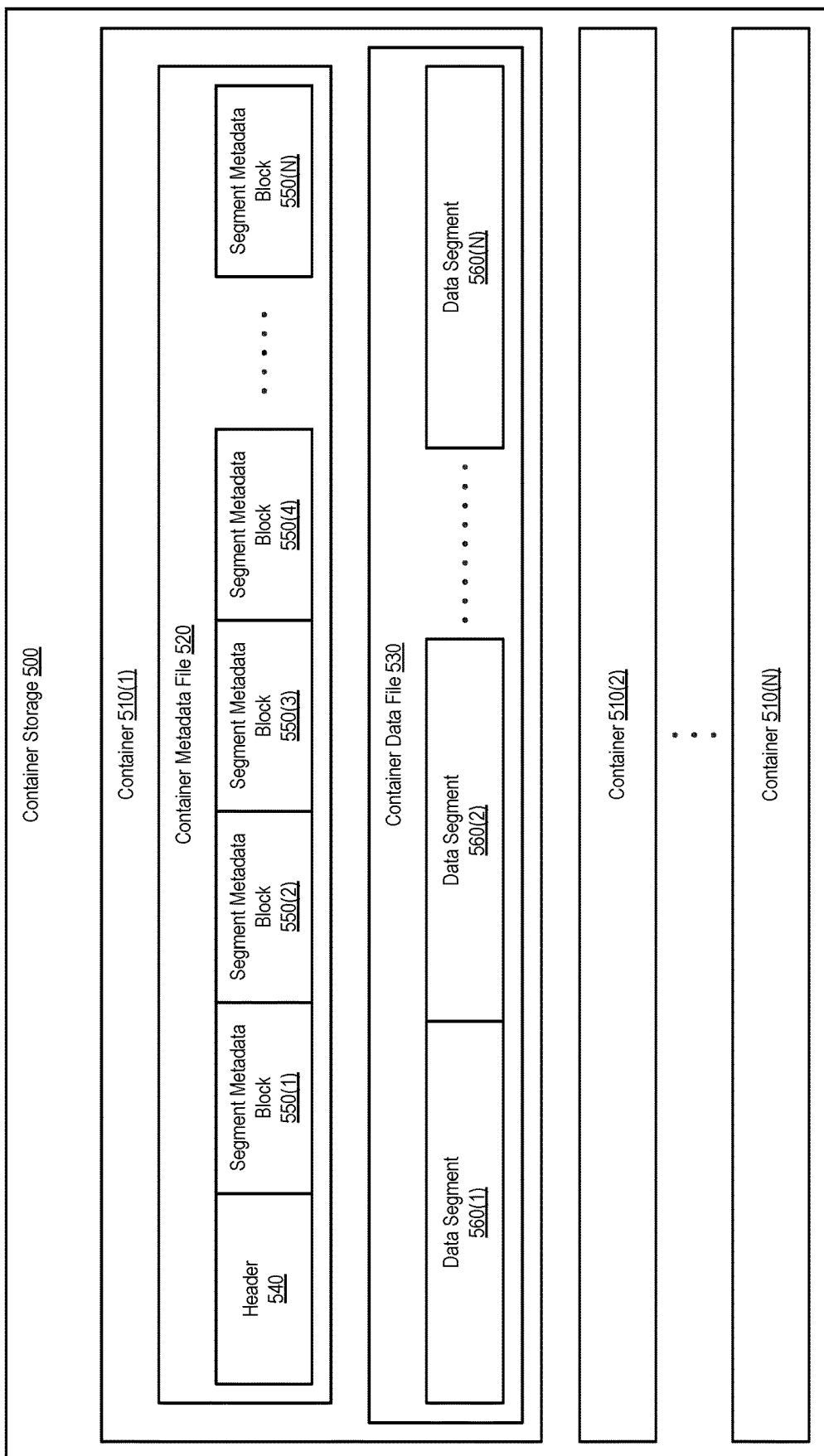
FIG. 5 is a simplified block diagram illustrating an example of container storage and containers therein, according to methods and systems such as those described herein.

FIG. 5 is a simplified block diagram illustrating an example of container storage, according to methods and systems such as those described herein. FIG. 5 thus depicts an example of container storage 330 as container storage 500 and, in so doing, provides greater detail as to the information stored therein. Container storage 500 provides for the storage of a number of containers (depicted in FIG. 5 as containers 510(1)-(N), and referred to in the aggregate as containers 510). While container storage 500 is depicted in FIG. 5 in a conceptual manner, in one embodiment, each of containers 510 can be implemented as one or more files in a file system such as those noted previously herein. Further detail is provided in connection with container 510(1). Container 510(1) is depicted as including a container metadata file 520 and a container data file 530. Container metadata file 520, in turn, includes a header 540 and some number of segment metadata blocks (depicted in FIG. 5 as segment metadata blocks 550(1)-(N), and referred to in the aggregate as segment metadata blocks 550). As will be appreciated in light of the present disclosure, segment metadata blocks 550 are comparable in content and structure to metadata entries 297(1)-(N), and are intended to be interchangeable therewith. Container data file 530 includes a number of data segments (depicted in FIG. 5 as data segments 560(1)-(N), and referred to in the aggregate as data segments 560).

Example Deduplication Systems Employing Machine Learning Techniques

Figure 6:
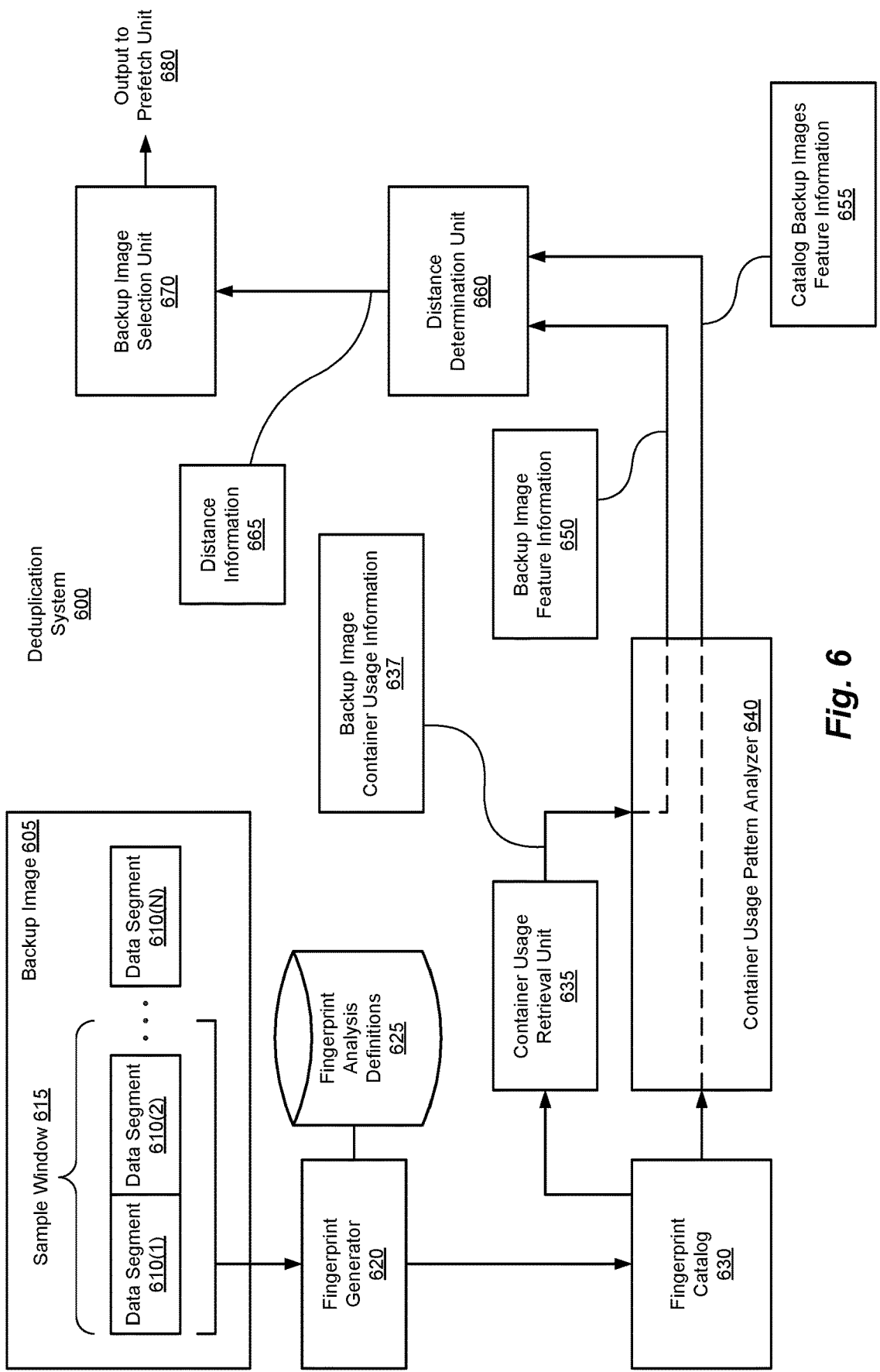
FIG. 6 is a simplified block diagram illustrating an example of a deduplication system, according to methods and systems such as those described herein.

FIG. 6 is a simplified block diagram illustrating an example of a deduplication system, according to methods and systems such as those described herein. FIG. 6 thus depicts a deduplication system 600 in which a new backup image (depicted in FIG. 6 as a backup image 605) is processed according to certain embodiments. Backup image 605 is divided into a number of data segments (depicted as data segments 610(1)-(N), and referred to in the aggregate as data segments 610). Some number of data segments 610 are used as a representative sample of the data in backup image 605. These ones of data segments 610 are selected based on a sample window 615. The data segments in sample window 615 are sent to a fingerprint generator 620, which generates fingerprints using one or more fingerprint analysis definitions (depicted as fingerprint analysis definitions 625), in the manner described in connection with FIGS. 1-5.

The fingerprints generated by fingerprint generator 620 are used to identify one or more containers in a fingerprint catalog 630. In so doing, a container usage retrieval unit 635 can retrieve backup image container usage information (depicted as backup image container usage information 637), and provide such backup image container usage information to a container usage pattern analyzer 640.

An example of the information included in backup image container usage information 637 (also referred to as container range information) is shown in Table 1.

TABLE 1

| An example of backup image container usage information. | |
|---|---|
| BID | B1 |
| Feature | ... |
| (l, μ, u) DCID | ... |
| Logical Size | ... |

In Table 1, "Feature" is information identifying a given feature (e.g., $f_{11}$, $f_{12}$, $f_{13}$, etc.), l is the lower bound for the DCID range of the feature, μ is the mean of the DCID range of the feature, u is the upper bound for the DCID range of the feature, and "Logical Size" is the size of the data at the mean of the range.

Container usage pattern analyzer 640 then performs analysis on backup image container usage information 637 such as that described earlier, and in so doing, generates backup image feature information 650. An example of the information included in backup image information 650 is shown in Table 2. Image feature information such as backup image feature information 650 is obtained from the attributes in Table 2.

TABLE 2

| An example of backup image attributes. | |
|---|---|
| DCID | ... |
| Size | ... |

Container usage pattern analyzer 640 can also generate feature information (depicted as catalog backup images feature information 655) in a comparable fashion. An example of the information included in catalog backup images feature information 655 is shown in Table 3. As will be appreciated in light of the present disclosure, each backup image can have multiple clusters (referred to herein as patterns). Each such pattern is described as the backup image's feature.

TABLE 3

An example of catalog backup images feature information.

| BID | Feature | Feature | Feature | Feature |
|-----|---------|---------|---------|---------|
| B1 | $f_{11}$ | $f_{12}$ | $f_{13}$ | ... |
| B2 | $f_{21}$ | $f_{22}$ | $f_{23}$ | ... |
| B3 | $f_{31}$ | $f_{32}$ | $f_{33}$ | ... |
| ... | ... | ... | ... | ... |

As will also be appreciated, container usage pattern analyzer 640, in order to perform container usage pattern mining operations, can also be trained using fingerprint and data container information stored in fingerprint catalog 634 existing backup images or comparable data inputs.

A distance determination unit 660 takes as input backup image feature information 650 and catalog backup images feature information 655, and produces information regarding distances between the features of the data segments in sample window 615 (ones of data segments 610), represented by backup image feature information 650), and features of the existing backup images, received as catalog backup images feature information 655. Distance determination unit 660 can perform, for example, a process described by dist (B_new, ∀B_i). Such distance information can be stored in, for example, a distance information data structure (e.g., a listing of value pairs [DCID, distance]), and transferred as distance information 665, to a backup image selection unit 670. An example of the information included in distance information 665 implemented as a distance list is shown in Table 4.

TABLE 4

An example of a distance information data structure.

| BID | Distance |
|-----|----------|
| B1 | $D_1$ |
| B2 | $D_2$ |
| B3 | $D_3$ |
| ... | ... |

Backup image selection unit 670 can, for example, select one or more backup images having distances from the features of backup image 605 (based on the ones of data segments 610 in sample window 615) of sufficiently "close" value. As will be further appreciated, the number of such backup images can be selected such that sufficiently-high deduplication performance (e.g., deduplication rate) is achieved, while minimizing the amount of backup image data to be transferred. The output of backup image selection unit 670 is output as an output two prefetch unit 680.

Figure 7:
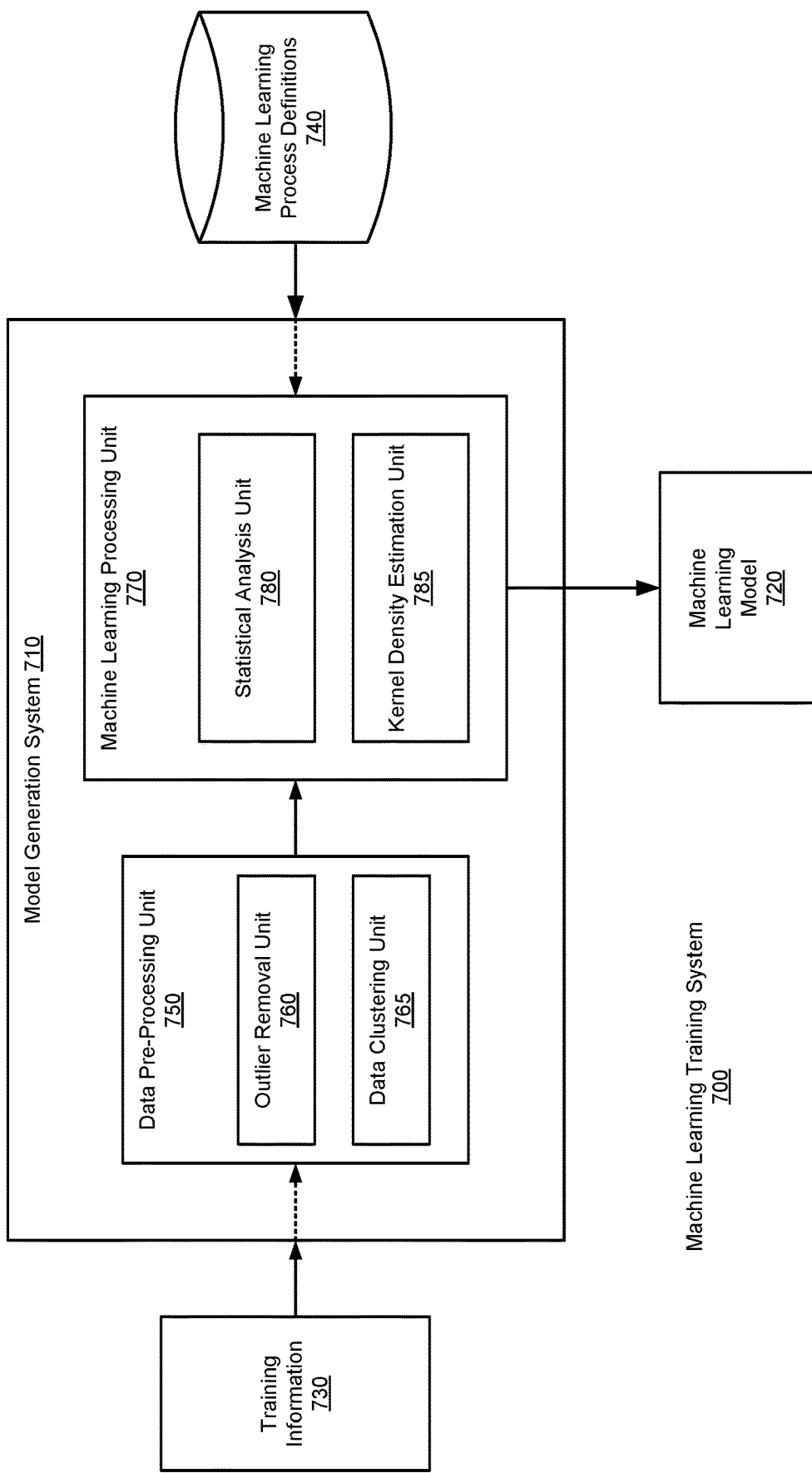
FIG. 7 is a simplified block diagram illustrating an example of a machine learning training system, according to methods and systems such as those described herein.

FIG. 7 is a simplified block diagram illustrating an example of a machine learning training system, according to methods and systems such as those described herein. FIG. 7 thus depicts a machine learning training system 700. Machine learning training system 700 includes a model generation system 710. Model generation system 710 generates a machine learning model 720 from training information 730, based on, for example, one or more machine learning process definitions (depicted as machine learning process definitions 740). In the manner noted, training information 730 can include the data of one or more backup images (e.g., the deduplicated data segments of one or more such backup images), the information regarding the fingerprints of which might be stored, for example, in a fingerprint catalog such as fingerprint catalog 630 of FIG. 6, described above.

Model generation system 710 takes in training information 730 as an input, and passes training information 730 through a data pre-processing unit 750. Data pre-processing unit 750 can include, in certain embodiments, an outlier removal unit 760 and a data clustering unit 765. In the manner noted, outlier removal unit 760 filters out outlying data points/clusters in order to allow the machine learning model generated (e.g., machine learning model 720) to more accurately determine the representative weight of a pattern or feature. As also noted, data clustering unit 765 clusters data points, such as fingerprints referenced by DCID (e.g., in [DCID, logical size] pairs), in the data received as training information 730, into clusters (groups) that can be analyzed with regard to features and patterns extent therein, and so facilitate more accurate representation by machine learning model 720. Data clustering unit 765 supports the clustering of data points, in order to define one or more groups having sufficiently high locality, in terms of DCID. For example, a density-based clustering algorithm such as density-based spatial clustering of applications with noise (DBSCAN) can be employed.

Training information 730, having been processed by data preprocessing unit 750, is output by data preprocessing unit 750 as preprocessed data, and is received by a machine learning processing unit 770. Machine learning processing unit 770 performs feature extraction on the preprocessed data in accordance with one or more machine learning process definitions received by machine learning processing unit 770 from machine learning process definitions 740, in order to generate machine learning model 720. To this end, machine learning processing unit 770 includes, in certain embodiments, a statistical analysis unit 780 and a kernel density estimation unit 785. Statistical analysis unit 780 can perform a statistical analysis (e.g., a Chi-square analysis) of the preprocessed data, in order to identify a probability density distribution that fits the preprocessed data. Kernel density estimation unit 785 provides functionality that supports the learning of features (e.g., such as mean, covariance, and bandwidth) of the selected distribution, as received from statistical analysis unit 780.

The operations performed by machine learning processing unit 770 result in machine learning model 720. Machine learning model 720 can then be used in analyzing the data segments of a backup image, in order to identify one or more backup images to be prefetched.

Figure 8:
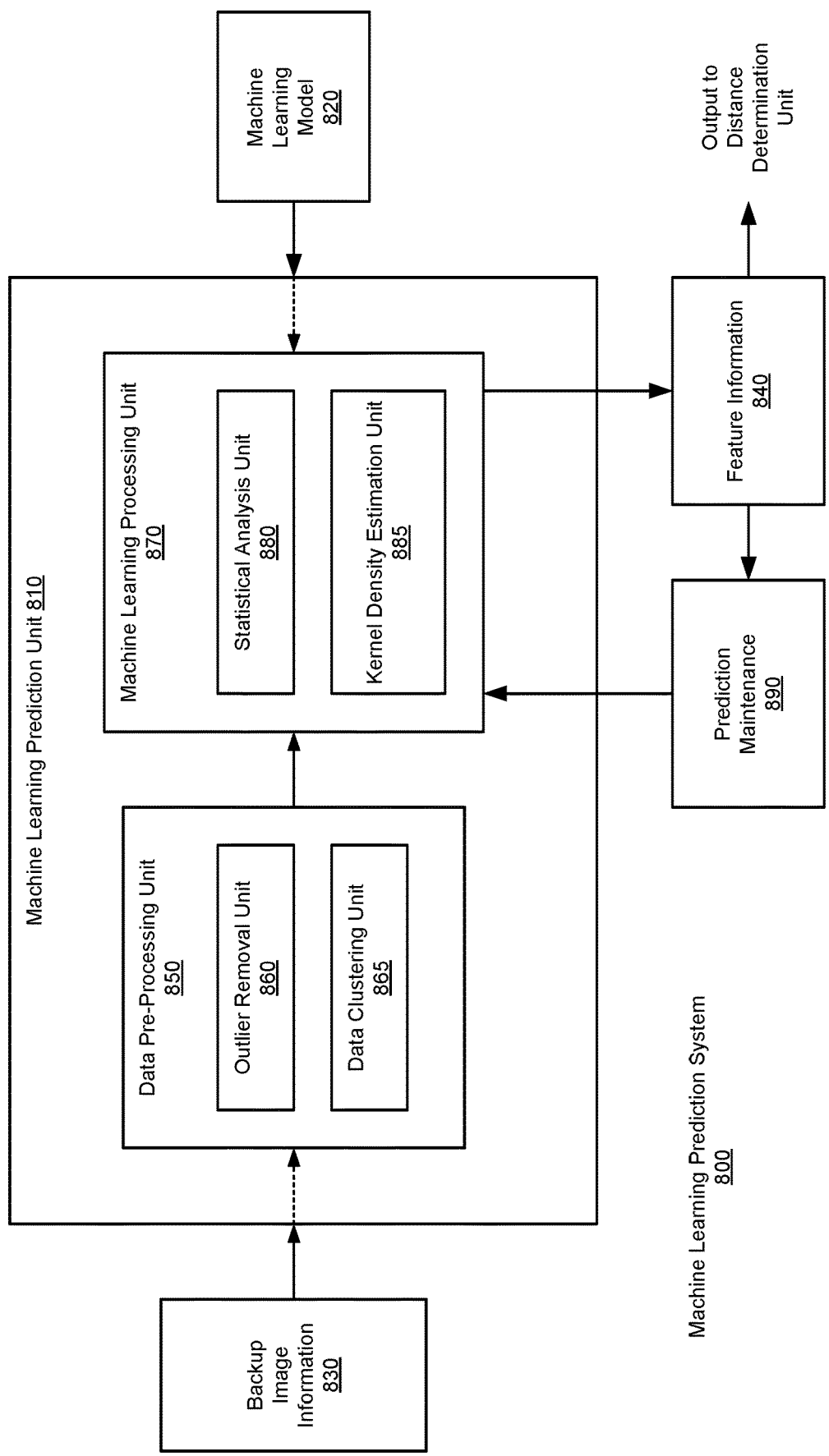
FIG. 8 is a simplified block diagram illustrating an example of a machine learning prediction system, according to methods and systems such as those described herein.

FIG. 8 is a simplified block diagram illustrating an example of a machine learning prediction system, according to methods and systems such as those described herein. FIG. 8 thus depicts a machine learning prediction system 800. Machine learning prediction system 800 includes a machine learning prediction unit 810. Machine learning prediction 810 receives a machine learning model 820 backup image information 830, and produces feature information 840. In the manner noted, backup image information 830, in certain embodiments, a sample of the data segments of a new backup image (e.g., as might be provided by a fingerprint generator such as fingerprint generator 620 of FIG. 6).

As with machine learning training system 700, machine learning prediction system 810 takes in backup information (in this case, backup image information 830) as an input, and passes this backup information through a data pre-processing unit 850. Data pre-processing unit 850 can include, in certain embodiments, an outlier removal unit 860 and a data clustering unit 865. In the manner noted, outlier removal unit 860 filters out outlying data points/clusters in order to more accurately depict the representative weight of a pattern or feature. As also noted, data clustering unit 865 clusters data points, such as fingerprints referenced by DCID (e.g., in [DCID, logical size] pairs), in the data received as training information 830, into clusters (groups) that can be analyzed with regard to features and patterns thereof. Data clustering unit 865 supports the clustering of data points, in order to define one or more groups having sufficiently high locality, in terms of DCID. For example, a density-based clustering algorithm such as density-based spatial clustering of applications with noise (DBSCAN) can be employed.

Backup image information 830, having been processed by data preprocessing unit 850, is output by data preprocessing unit 850 as preprocessed data, and is received by a machine learning processing unit 870. Machine learning processing unit 870 performs feature extraction on the preprocessed data in accordance with machine learning model 820. To this end, machine learning processing unit 870 includes, in certain embodiments, a statistical analysis unit 880 and a kernel density estimation unit 885. Statistical analysis unit 880 can perform a statistical analysis (e.g., a Chi-square analysis) of the preprocessed data, in order to identify a probability density distribution that fits the preprocessed data. Kernel density estimation unit 885 provides functionality that supports the learning of features (e.g., such as mean, covariance, and bandwidth) of the selected distribution, as received from statistical analysis unit 880.

The feature extraction performed by machine learning processing unit 870 results in feature information 840. Feature information 840 is passed to a distance determination unit (e.g., a distance determination unit such as distance determination unit 660 of FIG. 6). Additionally, in certain embodiments, feature information 840 can be passed to a prediction maintenance unit 890. Prediction maintenance unit 890 can provide for feedback of feature information such as feature information 842 machine learning processing unit 870, in order to maintain parameters used by statistical analysis unit 880 and/or kernel density estimation unit 885.

Example Deduplication Process

As noted previously, data deduplication (or more simply, deduplication) is a process that eliminates redundant copies of data and reduces storage and transfer overhead. Deduplication ensures that only one unique instance of data is retained on a storage device. Redundant data blocks are replaced with a pointer to the unique data copy. Source-based deduplication (also called client-side deduplication) removes redundant blocks before transmitting data to a backup target such as a storage device, and can also provide facilities for determining if such data transfer is needed by checking fingerprints against fingerprints maintained by, for example, a backup server and/or a deduplication server. Performing deduplication at the source can reduce bandwidth and storage use.

As also noted, deduplication involves linking references to data content. Although each data segment may be referenced by more than one backup image, storage reclamation can remove data segments in appropriate situations, such as if one or more backups associated with the data segments thus referenced have expired. For example, free space in the given data containers can be compacted to reclaim storage space recently made available, for example, as a result of the deletion of one or more backups resulting from the given backups having expired.

Figure 9A:
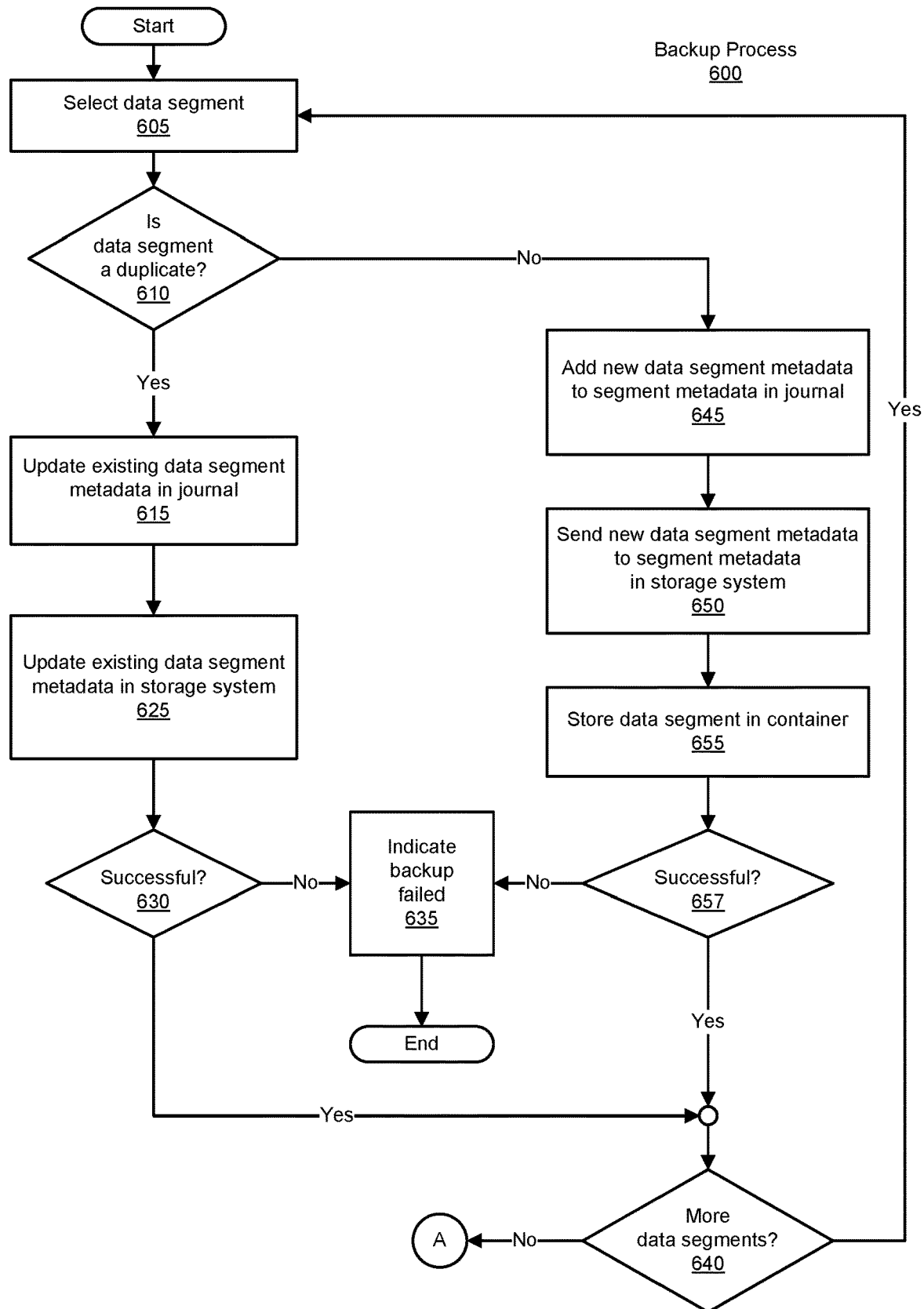
FIGS. 9A and 9B depict a flow diagram illustrating an example of a process for performing a deduplicated backup operation, according to embodiments of methods and systems such as those disclosed herein.
Figure 9B:
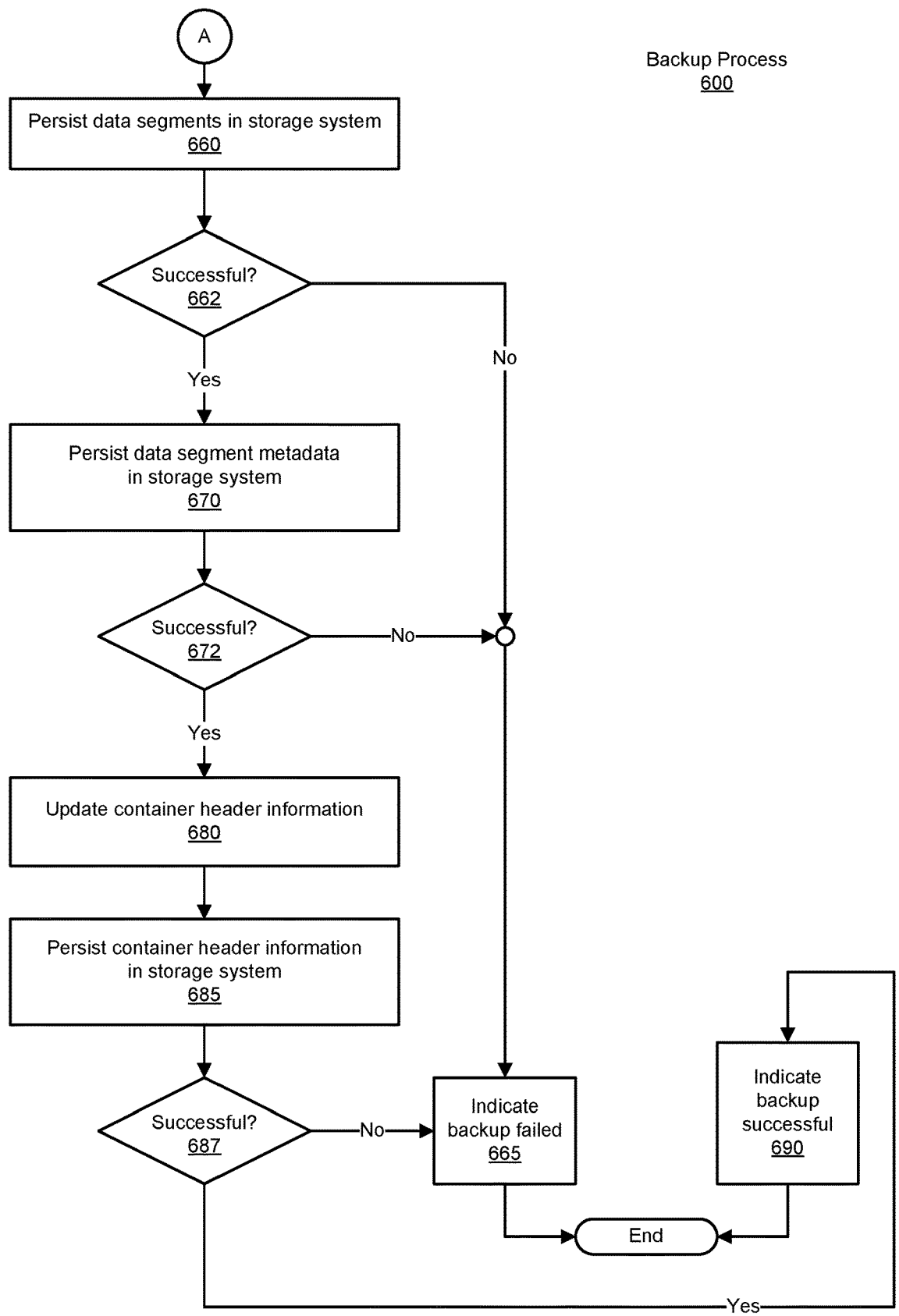

FIGS. 9A and 9B depict a flow diagram illustrating an example of a process for performing a deduplicated backup operation, according to embodiments of methods and systems such as those disclosed herein. That being the case, a deduplicated backup process 900 (or more simply backup process 900) is depicted. Backup process 900 begins with the receipt of an indication that a deduplicated backup is to be performed (not shown). If no such event has occurred, backup process 900 iterates, awaiting the occurrence of such an event. In response to a determination that a backup operation is to be performed, the data that is the subject of the backup operation is divided into a number of data segments. Each of these data segments can be represented by a fingerprint, as noted. To allow the present discussion to focus on the salient features of the embodiments described herein, backup process 900 depicts a simpler deduplication process then might otherwise be implemented. For example, caching of fingerprints at a client or server can be implemented, as can a number of techniques directed to improving backup operation performance.

With that in mind, backup process 900 begins with the selection of one of the data segments to be backed up (905). A determination is then made as to whether the data segment in question is a duplicate (910). If the data segment in question is a duplicate (and so, a duplicate data segment has already been stored), the corresponding data segment metadata stored in the journal is updated (915). Next, existing data segment metadata stored in the storage system is updated (925). A determination is made as to whether these operations were successful (930).

If the operations associated with updating the data segment's metadata were unsuccessful (e.g., some manner of failure was encountered), an indication to the effect that the attempted backup has failed is made (935). Backup process 900 then concludes. It will be appreciated that, as discussed subsequently, the indication of a failed backup may be used to prompt another attempt to backup the data in question.

If the operations associated with updating the data segment's metadata were successful, however, backup process 900 proceeds to a determination as to whether more data segments remain for deduplication (940). If further data segments remain for deduplication, backup process 900 loops to the selection of the next data segment (905) and backup process 900 continues. Alternatively, if the data in question has been deduplicated (940), backup process 900 proceeds to the remainder of that process by way of connector "A" to the process depicted in FIG. 9B.

Returning to the determination as to whether the data segment in question is a duplicate (910), if that determination indicates that the data segment in question is not a duplicate, backup process 900 proceeds with adding new data segment metadata (i.e., a new segment metadata block) to the copy of the container metadata stored in the journal (945). This new data segment metadata is also sent to the storage system for storage as a new segment metadata block in the container metadata (950).

As before, a determination is made as to whether the foregoing storage operations were successful (957). In the case in which these operations encountered a failure, an indication to that effect is made (935) and backup process 900 concludes. Alternatively, if the storage operations were successful, backup process 900 proceeds with making a determination as to whether further data segments remain to be deduplicated (940). As before, if further data segments remain, backup process 900 loops to the selection of the next data segment (905) and backup process 900 proceeds with the processing of that data segment. In the alternative, if no further data segments remain, backup process 900 proceeds to the remainder of that process by way of connector "A" to the process depicted in FIG. 9B.

FIG. 9B depicts the remainder of backup process 900. Beginning with connector "A", backup process 900 proceeds with persisting the (deduplicated) data segments in the storage system (960). As before, a determination is made as to whether this operation was successful (962). If the operation was unsuccessful, an indication that the backup operation has failed is provided (965). As before, in such a situation, backup process 900 then concludes.

If the backup's data segments were successfully persisted to the storage system, backup process 900 proceeds with the persisting of data segment metadata (segment metadata blocks) in the storage system parentheses 970). Once again, a determination is made as to whether the operation in question was perform successfully (972). Also as before, if the operation was not perform successfully, an indication to this effect is provided (965) and backup process 900 concludes.

In the alternative, if the data segment metadata in question was successfully persisted to the storage system, container header information is updated (980) and is persisted to the storage system (985). Again, a determination is made as to whether the operations related to the given container header information were successful (987). If these operations were unsuccessful, an indication to this effect is provided (965) and backup process 900 concludes. Alternatively, if the operations related to saving the container header information were successful, an indication that the backup operations of backup process 900 were successful is provided (990) and backup process 900 concludes.

Examples of Deduplication Cache Operation Using Machine Learning

Figure 10:
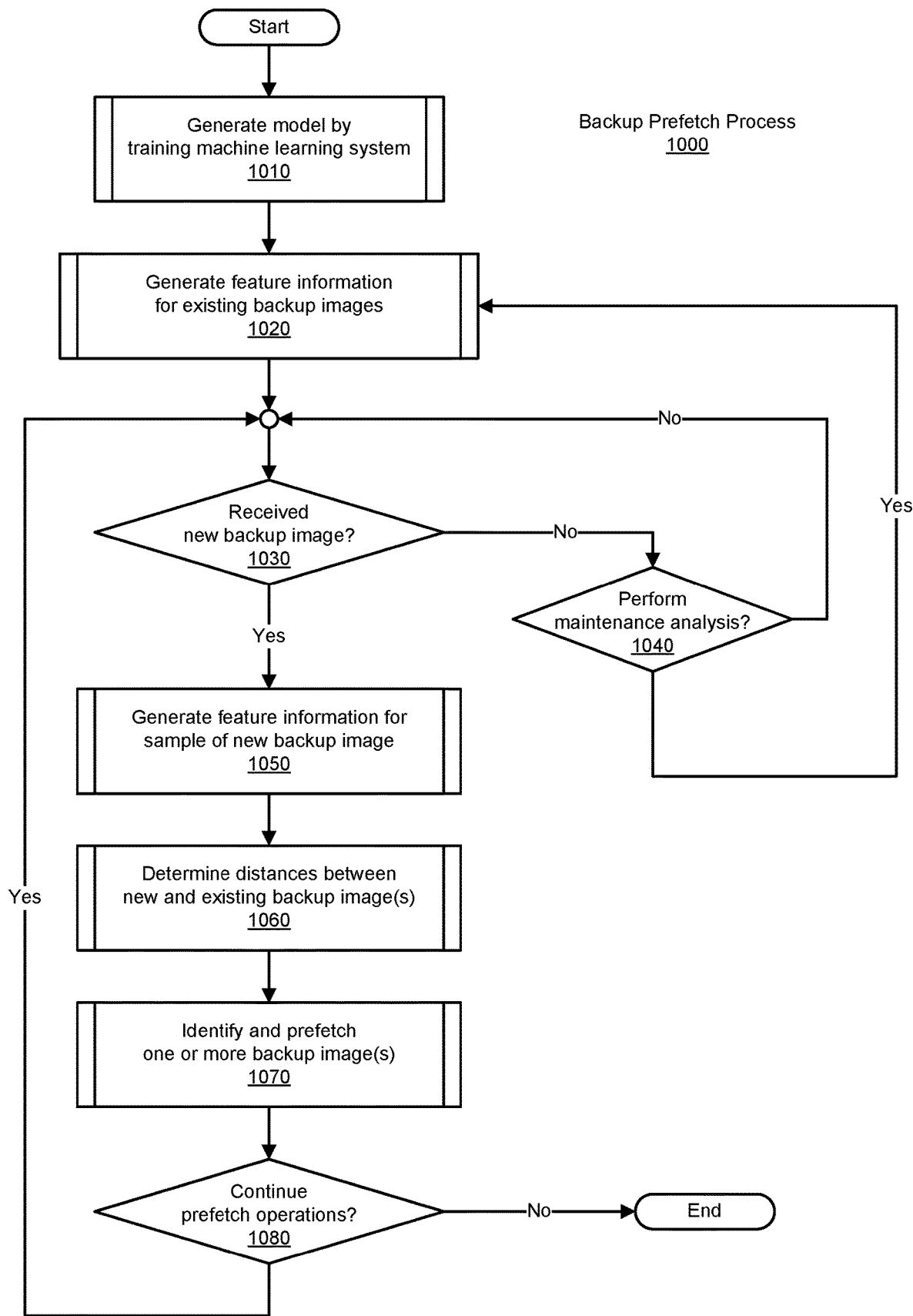
FIG. 10 is a flow diagram illustrating an example of a backup prefetch process, according to one embodiment.

FIG. 10 is a flow diagram illustrating an example of a backup prefetch process, according to one embodiment. FIG. 10 thus depicts a backup prefetch process 1000. Backup prefetch process 1000 begins with the generation of a model, which can be accomplished by training the machine learning system in question (1010). Such model generation can be performed by a model generation systems such as model generation system 710 of FIG. 7. An example of such a model generation process is described in further detail in connection with FIG. 11, subsequently.

Next, feature information is generated for one or more existing backup images (1020). Such feature information can be generated by a container usage pattern analyzer such as container usage pattern analyzer 640, which can be implemented in the manner of machine learning prediction unit 810. An example of such a feature information generation process is described in further detail in connection with FIG. 11, subsequently.

At this juncture, backup prefetch process 1000 awaits the receipt of a new backup image (1030). Until such time as a new backup image is received, backup prefetch process 1000 iterates. As part of such iteration, backup prefetch process 1000 can make a determination as to whether maintenance analysis needs to be performed (1040). Such maintenance analysis can be performed on a periodic basis, such as on a daily, weekly, or monthly basis, depending on the frequency with which existing backup images change. Alternatively, such a determination can be based on the amount of data represented by the existing backup images, by sampling such existing backup images to determine a percentage amount of change thereto, and/or by some other convenient metric. In the case in which no such maintenance analysis is to be performed, backup prefetch process 1000 loops to awaiting a new backup image (1030). Alternatively, if maintenance analysis is to be performed, backup prefetch process 1000 loops to the generation of feature information for existing backup images (1020). An example of such a feature information generation process is described in further detail in connection with FIG. 12, subsequently.

Once a new backup images received, feature information can be generated for the new backup image (or a sample portion thereof) (1050). An example of such a feature information generation process is described in further detail in connection with FIG. 13, subsequently. Next, a determination can be made as to the distances between features of the (sample portion of) the new backup image and those of one or more existing backup images (1060). An example of such a distance determination process is described in further detail in connection with FIG. 14, subsequently. Once the distances in question have been determined, one or more backup images are identified and can be prefetched (1070). An example of such a process is described in further detail in connection with FIG. 14, subsequently. A determination is then made as to whether prefetch operations are to continue (1080). In the case in which prefetch operations are to continue, backup prefetch process 1000 loops to awaiting the next new backup image (1030). Alternatively, if prefetch operations are not to be continued, backup prefetch process 1000 concludes.

Figure 11:
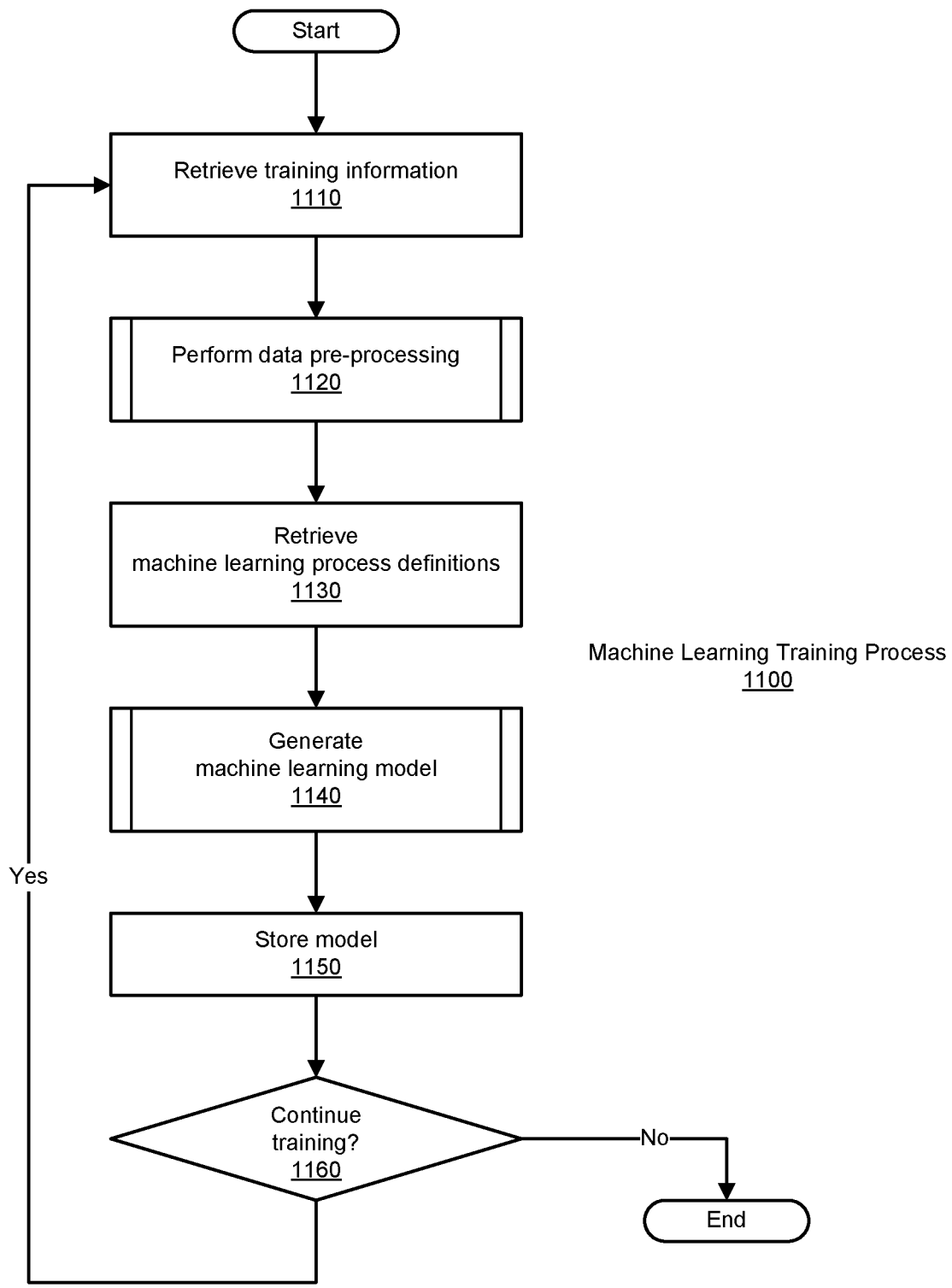
FIG. 11 is a flow diagram illustrating an example of a machine learning training process, according to one embodiment.

FIG. 11 is a flow diagram illustrating an example of a machine learning training process, according to one embodiment. As noted in connection with the description of FIG. 10, FIG. 11 thus depicts a machine learning training process 1100. Machine learning training process 1100 begins with the retrieval of training information (1110). Such training information can be the deduplicated data segments of one or more existing backup images, for example, in the manner of training information 730 of FIG. 7.

Data preprocessing is then performed on the training information retrieved (1120). Such data preprocessing can be performed, for example, by a data preprocessing unit such as data preprocessing unit 750 of FIG. 7, and can include outlier removal and data clustering, in the manner previously noted. One or more machine learning process definitions are also retrieved (1130), as by a machine learning processing unit such as machine learning processing unit 770. Such a machine learning processing unit can then perform machine learning model generation (1140), which can include statistical analysis and/or kernel density estimation, in the manner noted. As was also noted, the machine learning model thus generated can then be used perform feature extraction, such as that described in connection with FIGS. 12 and 13, subsequently. The machine learning model thus generated can then be stored (1150). A determination is then made as to whether training operations should be continued (1160). In the case in which training operations are to continue, machine learning training process 1100 loops to the retrieval of additional training information (1110). Alternatively, if training operations are to cease, machine learning training process 1100 concludes.

Figure 12:
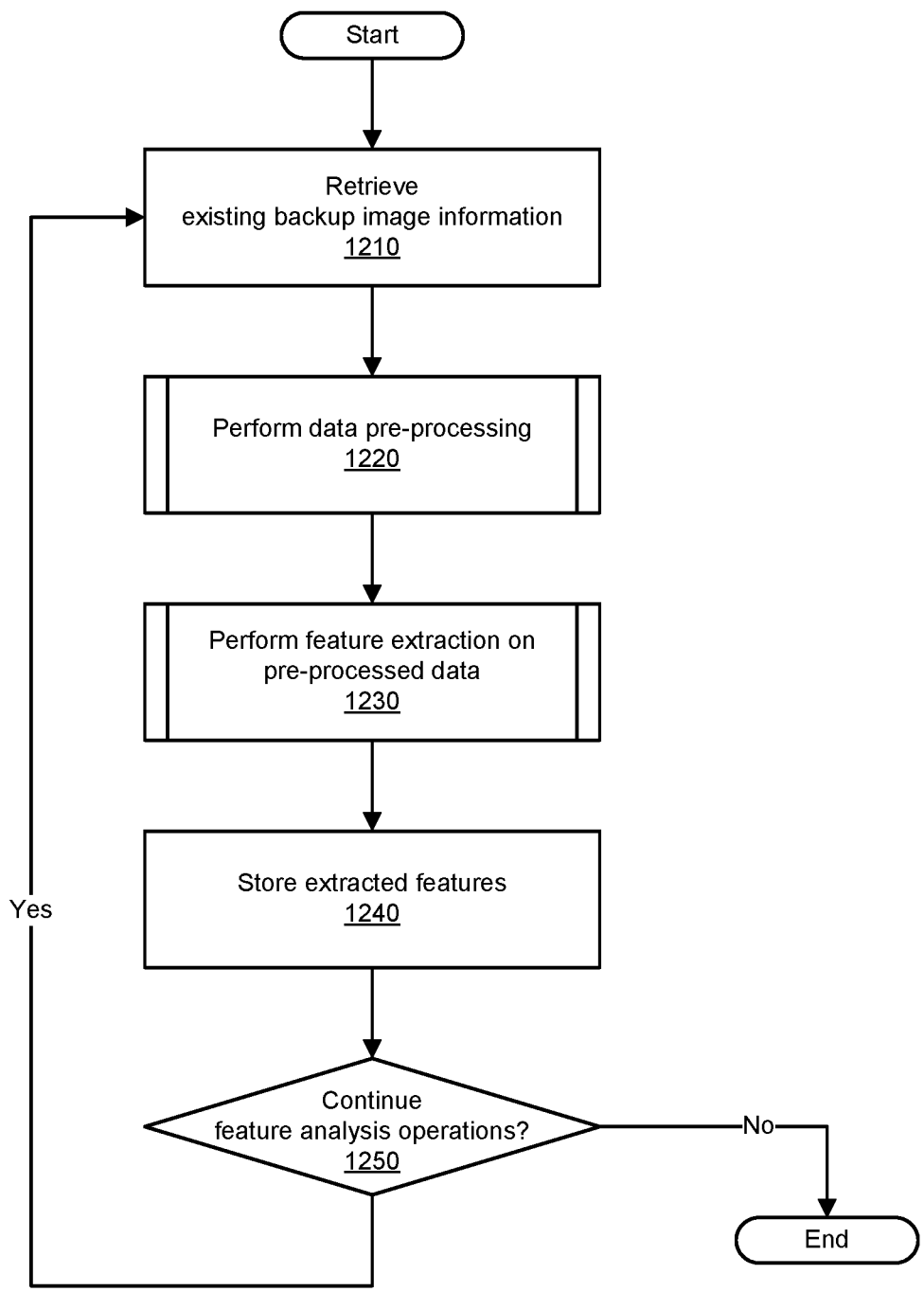
FIG. 12 is a flow diagram illustrating an example of a existing feature information generation process, according to one embodiment.

FIG. 12 is a flow diagram illustrating an example of an existing feature information generation process, according to one embodiment. As noted in connection with the description of FIG. 10, FIG. 12 thus depicts an existing feature information generation process 1200. Existing feature information generation process 1200 begins with the retrieval of existing backup image information (1210). Such existing backup image information can be, for example, deduplicated data segments of one or more existing backup images. Next, data pre-processing is performed (1220). In the manner noted, such data pre-processing can include the application of a data clustering algorithm (e.g., DBSCAN) to cluster or group the data based on the locality, and outlier removal in order to filter out outlying data points. Such data pre-processing can be performed by a data pre-processing unit such as data pre-processing unit 850 of FIG. 8. The pre-processed data is then passed from the data pre-processing unit to a machine learning processing unit (e.g. machine learning processing unit 870 of FIG. 8), which performs feature extraction on the pre-processed data (1230). Such feature extraction can include statistical analysis and/or kernel density estimation, in the manner noted. The features and/or patterns thus extracted are then stored (1240). A determination is then made as to whether the feature analysis operations of existing feature information generation process 1200 are to be continued (1250). In the case in which such feature analysis operations are to continue, existing feature information generation process 1200 loops to the retrieval of further backup image information (1210). Alternatively, if the desired existing backup images have been analyzed, existing feature information generation process 1200 concludes.

Figure 13:
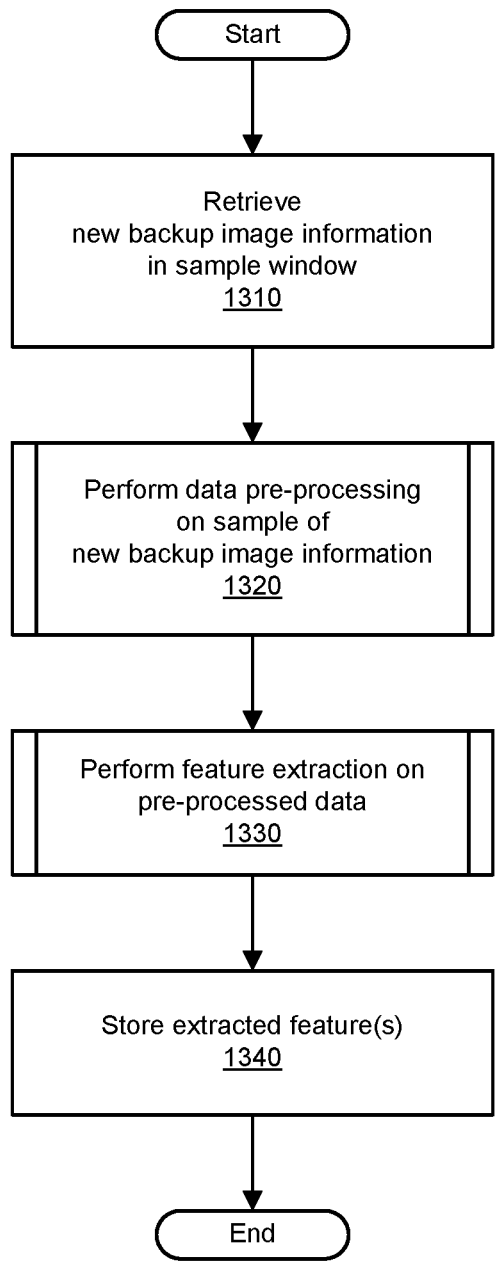
FIG. 13 is a flow diagram illustrating an example of a sample feature information generation process, according to one embodiment.

FIG. 13 is a flow diagram illustrating an example of a sample feature information generation process, according to one embodiment. As noted in connection with the description of FIG. 10, FIG. 13 thus depicts a sample feature information generation process 1300. Sample feature information generation process 1300 begins with the retrieval of new backup image information that is within the sample window in question (1310). Such new backup image information can be, for example, data segments of a new backup image. Next, data pre-processing is performed (1320). In the manner noted, such data pre-processing can include the application of a data clustering algorithm (e.g., DBSCAN) to cluster or group the data based on the locality, and outlier removal in order to filter out outlying data points. Such data pre-processing can be performed by a data pre-processing unit such as data pre-processing unit 850 of FIG. 8. The pre-processed data is then passed from the data pre-processing unit to a machine learning processing unit (e.g. machine learning processing unit 870 of FIG. 8), which performs feature extraction on the pre-processed data (1330). Such feature extraction can include statistical analysis and/or kernel density estimation, in the manner noted. The features and/or patterns thus extracted are then stored (1340). Sample feature information generation process 1300 then concludes.

Figure 14:
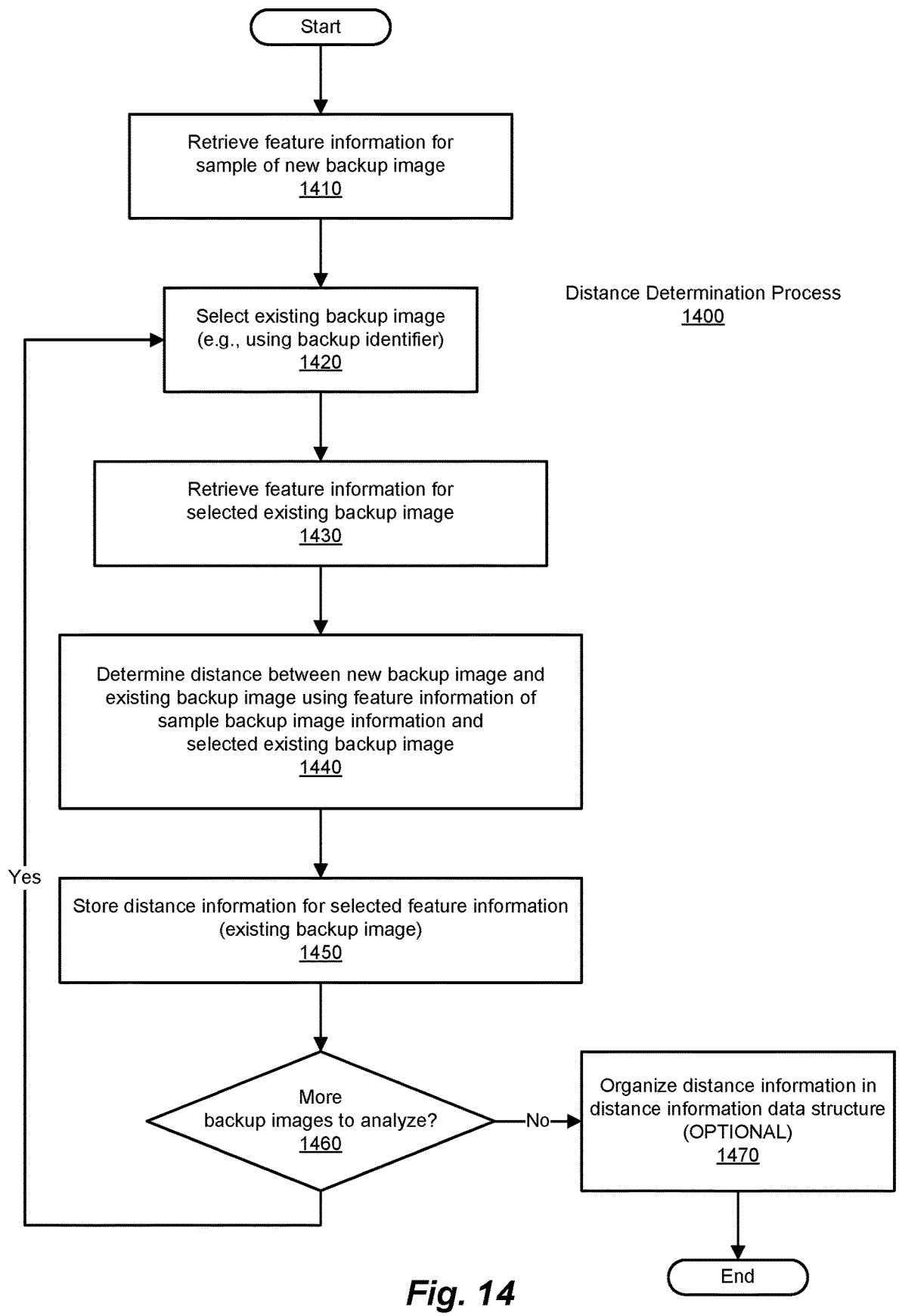
FIG. 14 is a flow diagram illustrating an example of a distance determination process, according to one embodiment.

FIG. 14 is a flow diagram illustrating an example of a distance determination process, according to one embodiment. As noted in connection with the description of FIG. 10, FIG. 14 thus depicts a distance determination process 1400. Distance determination process 1400 begins with the retrieval of feature information for a given sample of a new backup image (1410). Next, an existing backup image is selected (e.g., using the existing backup image's backup identifier) (1420). Next, feature information for the selected existing backup image is retrieved (1430). A distance between the features of the new backup image and those of the existing backup image are determined using the feature information of the sample backup image information and that of the selected existing backup image (1440). The distance information thus generated is stored for the selected existing backup image (1450). A determination is then made as to whether more backup images remain to be analyzed (1460). In the case in which more backup images remain to be analyzed, distance determination process 1400 loops to selecting the next existing backup image for processing (1420). Alternatively, if no further backup images remain to be analyzed, distance determination process 1400 proceeds to the optional step of organizing distance information stored in a distance information data structure (1470). For example, in embodiments in which the distance information data structure is a list of distance information identified by the backup identifiers, the list can be ordered in some manner e.g., closest to most distant), and so in a manner that allows for the selection of some number of the closest backup images. The determination as to the number of backup images to be prefetched (into the cache in question) can be made, for example, empirically, based on a balance between the efficiency provided by a greater number of backup images and the resources needed to transfer the given amount of data segments. Distance determination process 1400 then concludes.

Figure 15:
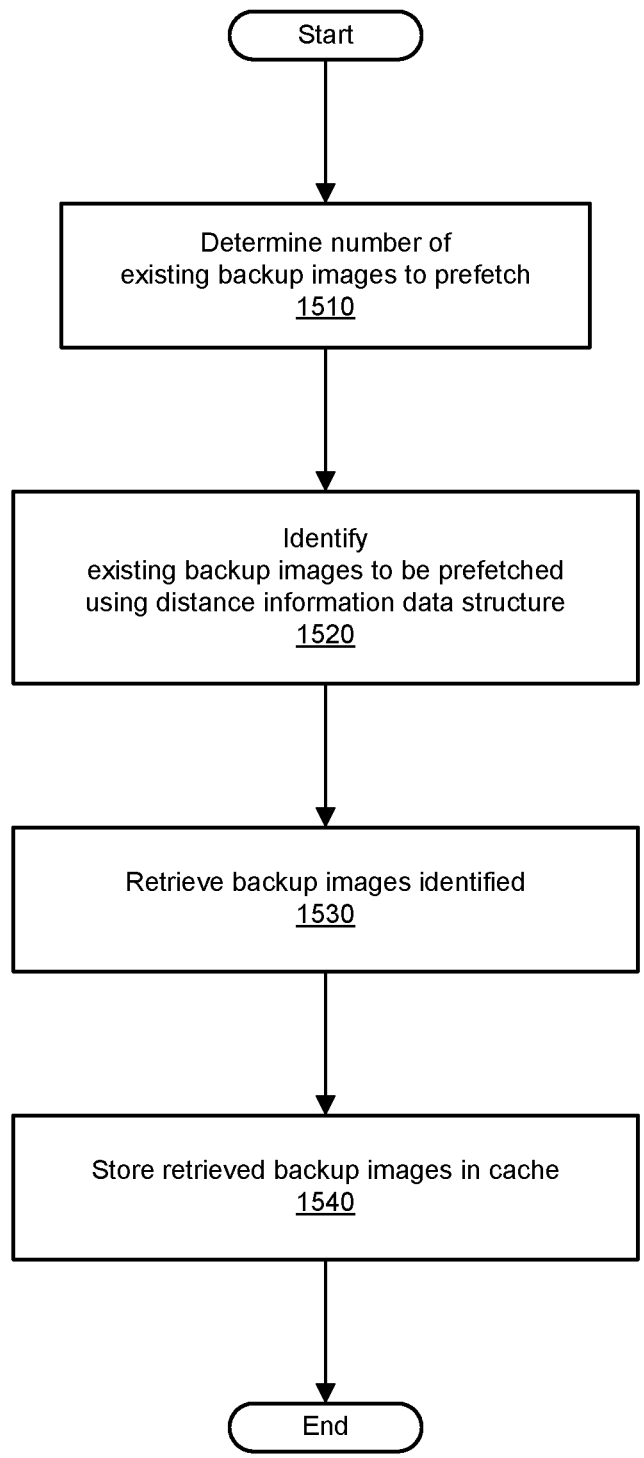
FIG. 15 is a flow diagram illustrating an example of a backup image prefetch process, according to one embodiment.

FIG. 15 is a flow diagram illustrating an example of a backup image prefetch process, according to one embodiment. As noted in connection with the description of FIG. 10, FIG. 15 thus depicts a backup image prefetch process 1500. Backup image prefetch process 1500 begins with a determination as to the number of existing backup images to prefetch (1510). As just noted, the number of backup images prefetched can be determined, for example, in an empirical manner. The existing backup images to be prefetched are then identified using the distance information data structure (e.g., in the manner described previously) (1520). The backup images thus identified are then retrieved (1530). The retrieved backup images are then stored in the cache in question (1540). As will be appreciated, the retrieval and caching of these backup images is intended to be performed prior to deduplication operations being performed on the new backup image. However, such operations can be performed subsequent to the initiation of such deduplication operations, in certain embodiments. Backup image prefetch process 1500 then concludes.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 160), one or more applications, and data. Examples of such computing and network environments are described below with reference to FIGS. 16 and 17.

Figure 16:
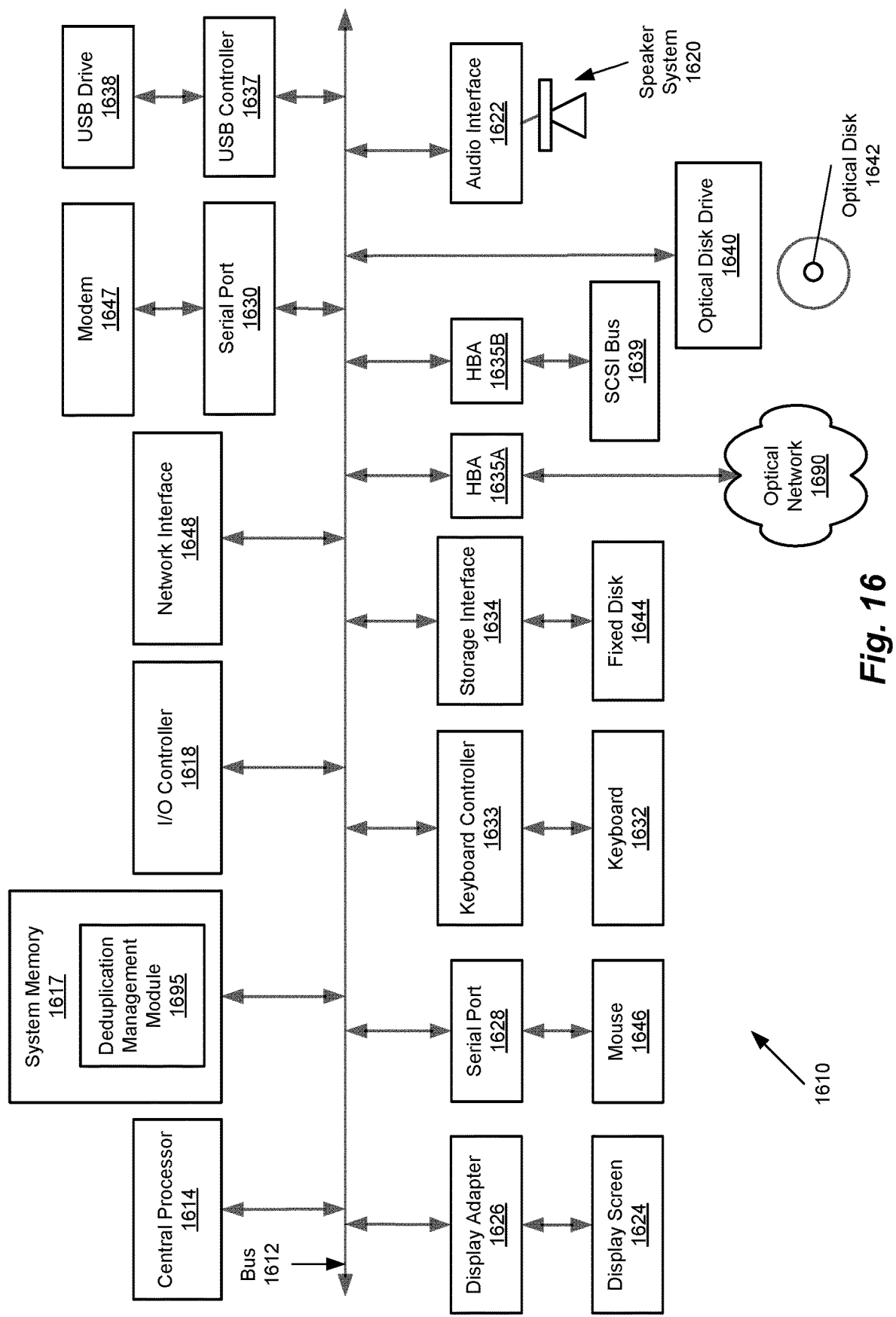
FIG. 16 is a simplified block diagram illustrating components of an example computer system suitable for implementing embodiments of the present disclosure, according to one embodiment.

FIG. 16 depicts a block diagram of a computer system 1610 suitable for implementing aspects of the systems described herein. Computer system 1610 includes a bus 1612 which interconnects major subsystems of computer system 1610, such as a central processor 1614, a system memory 1617 (typically RAM, but which may also include ROM, flash RAM, or the like), an input/output controller 1618, an external audio device, such as a speaker system 1620 via an audio output interface 1622, an external device, such as a display screen 1624 via display adapter 1626, serial ports 1628 and 1630, a keyboard 1632 (interfaced with a keyboard controller 1633), a storage interface 1634, a USB controller 1637 operative to receive a USB drive 1638, a host bus adapter (HBA) interface card 1635A operative to connect with a optical network 1690, a host bus adapter (HBA) interface card 1635B operative to connect to a SCSI bus 1639, and an optical disk drive 1640 operative to receive an optical disk 1642. Also included are a mouse 1646 (or other point-and-click device, coupled to bus 1612 via serial port 1628), a modem 1647 (coupled to bus 1612 via serial port 1630), and a network interface 1648 (coupled directly to bus 1612).

Bus 1612 allows data communication between central processor 1614 and system memory 1617, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1610 are generally stored on and accessed from a computer-readable storage medium, such as a hard disk drive (e.g., fixed disk 1644), an optical drive (e.g., optical drive 1640), a universal serial bus (USB) controller 1637, or other computer-readable storage medium.

Storage interface 1634, as with the other storage interfaces of computer system 1610, can connect to a standard computer-readable medium for storage and/or retrieval of information, such as a fixed disk drive 1644. Fixed disk drive 1644 may be a part of computer system 1610 or may be separate and accessed through other interface systems. Modem 1647 may provide a direct connection to a remote server via a telephone link or to the Internet via an internet service provider (ISP). Network interface 1648 may provide a direct connection to a remote server via a direct network link to the Internet via a POP (point of presence). Network interface 1648 may provide such connection using wireless techniques, including digital cellular telephone connection, Cellular Digital Packet Data (CDPD) connection, digital satellite data connection or the like. Also depicted as part of computer system 1610 is a deduplication management module 1695, which is resident in system memory 1617 and provides functionality and operations comparable to the deduplication processes described earlier herein.

Many other devices or subsystems (not shown) may be connected in a similar manner (e.g., document scanners, digital cameras and so on). Conversely, all of the devices shown in FIG. 16 need not be present to practice the systems described herein. The devices and subsystems can be interconnected in different ways from that shown in FIG. 16. The operation of a computer system such as that shown in FIG. 16 will be readily understood in light of the present disclosure. Code to implement portions of the systems described herein can be stored in computer-readable storage media such as one or more of system memory 1617, fixed disk 1644, optical disk 1642, or USB drive 1638. The operating system provided on computer system 1610 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 17:
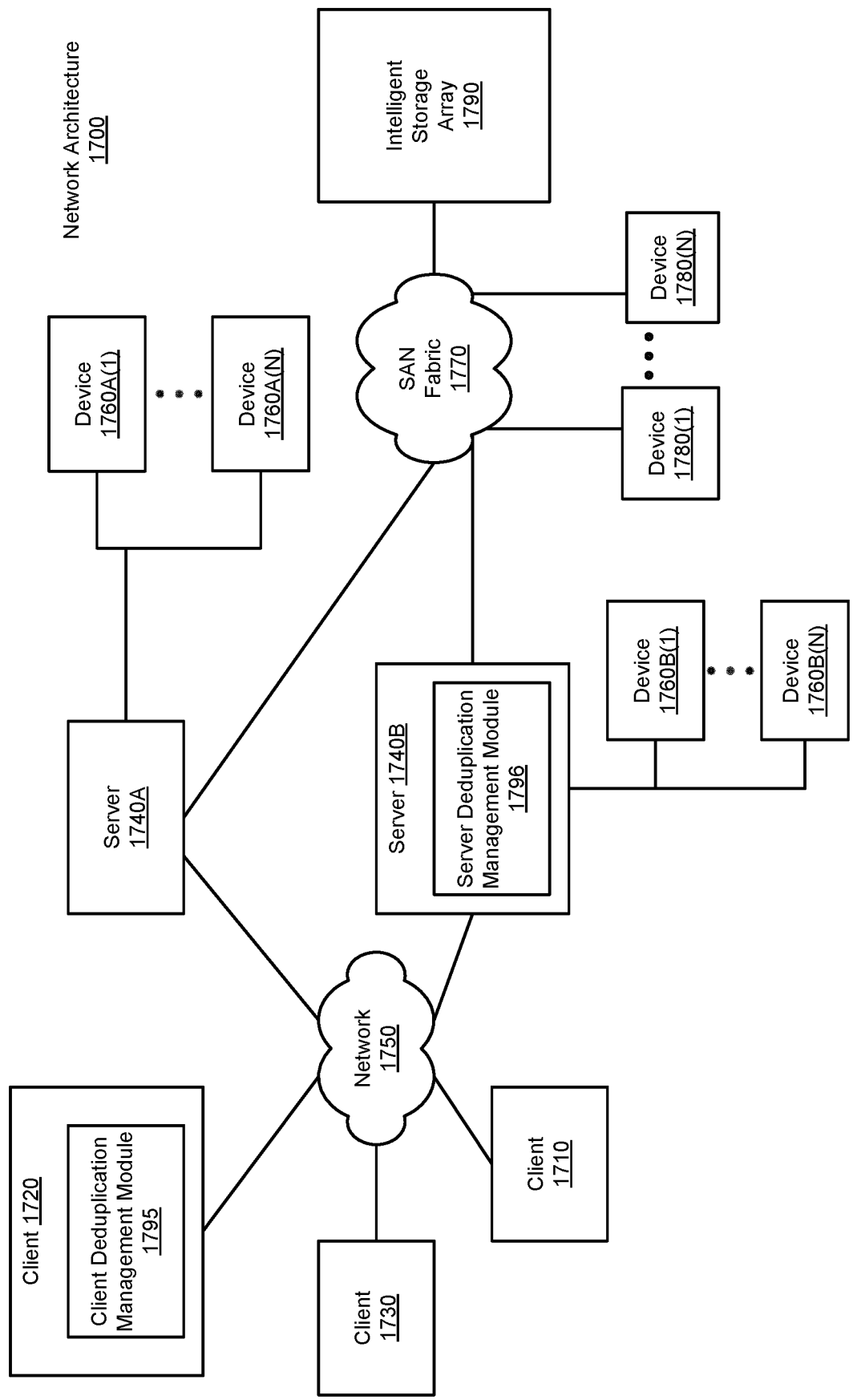
FIG. 17 is a simplified block diagram illustrating components of an example computer system suitable for implementing embodiments of the present disclosure, according to one embodiment.

FIG. 17 is a block diagram depicting a network architecture 1700 in which client systems 1710, 1720 and 1730, as well as storage servers 1740A and 1740B (any of which can be implemented using computer system 1710), are coupled to a network 1750. Storage server 1740A is further depicted as having storage devices 1760A(1)-(N) directly attached, and storage server 1740B is depicted with storage devices 1760B(1)-(N) directly attached. Storage servers 1740A and 1740B are also connected to a SAN fabric 1770, although connection to a storage area network is not required for operation. SAN fabric 1770 supports access to storage devices 1780(1)-(N) by storage servers 1740A and 1740B, and so by client systems 1710, 1720 and 1730 via network 1750. An intelligent storage array 1790 is also shown as an example of a specific storage device accessible via SAN fabric 1770.

Also depicted as part of network architecture 1700 are a client deduplication management module 1795 (installed in client 1720), and a server deduplication management module 1796 (installed in server 1740B), which are comparable in function and operation to various of the deduplication management modules described earlier herein. For example, using the components depicted in FIG. 6, client deduplication management module 1795 can provide functionality associated with the generation of backup image 605 (as well as the segmentation of backup image 605 into data segments 610), sample window 615, and fingerprint generation (e.g., as by figure print generator 620). Further, server deduplication management module 1796 can support storage and maintenance of fingerprint catalog 630, as well as the functionalities provided by container usage retrieval unit 635, container usage pattern analyzer 640, distance determination unit 660, backup image selection unit 670, and provide for the prefetching of such backup images.

With reference to computer system 1610, modem 1647, network interface 1648 or some other method can be used to provide connectivity from each of client computer systems 1710, 1720 and 1730 to network 1750. Client systems 1710, 1720 and 1730 are able to access information on storage server 1740A or 1740B using, for example, a web browser or other client software (not shown). Such a client allows client systems 1710, 1720 and 1730 to access data hosted by storage server 1740A or 1740B or one of storage devices 1760A(1)-(N), 1760B(1)-(N), 1780(1)-(N) or intelligent storage array 1790. FIG. 17 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components. Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled." to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   generating new feature information for a portion of data, wherein
      the portion of the data is a sample of data of a new backup image,
      the new backup image is a full image,
      the sample of the data of the new backup image is the data of the new backup image that is within a sample window of the data of the new backup image,
      the new feature information comprises one or more generative models for a machine learning process,
      the new feature information of the sample of the data is representative of one or more features of the data of the new backup image by virtue of the one or more generative models being representative of one or more features of the data of the new backup image,
      the one or more features are representative of container usage of the new backup image,
      the container usage of the new backup image comprises a logical size of each of one or more fingerprints stored in a data container of the new backup image and a data container identifier of the data container of the new backup image, and
      the machine learning process receives the portion of the data of the new backup image as an input;
   for each existing backup image in a plurality of existing backup images,
      comparing the new feature information with existing feature information, wherein
         the each existing backup image is another full image,
         the each existing backup image comprises existing data,
         the existing feature information is representative of one or more existing features of the data of the each existing backup image,
         the one or more existing features are representative of container usage of the each existing backup image,
         the container usage of the each existing backup image comprises another logical size of each of one or more fingerprints stored in a data container of the each existing backup image and a data container identifier of the data container of the each existing backup image,
         the existing feature information comprises one or more other generative models for the machine learning process,
         the comparing comprises
            performing a distance determination operation,
         the distance determination operation determines a distance between a feature of the new feature information and a feature of the existing feature information based on the logical size of the each of the one or more fingerprints stored in the data container of the new backup image, the data container identifier of the data container of the new backup image, the another logical size of the each of the one or more fingerprints stored in the data container of the each existing backup image, and the data container identifier of the data container of the each existing backup image, and
         the comparing results in corresponding distance information for the each existing backup image, with respect to the new feature information;
   in response to the comparing, selecting one or more of the plurality of existing backup images as selected existing backup images, based, at least in part, on the corresponding distance information for each of the plurality of existing backup images; and
   prefetching the selected existing backup images.

2. The method of claim 1, wherein the generating comprises:
   producing pre-processed data by performing one or more data pre-processing operations on the portion of the data; and
   producing the new feature information by performing a feature extraction operation on the pre-processed data, wherein
      the feature extraction operation is comprised in the machine learning process.

3. The method of claim 2, wherein
the one or more data pre-processing operations comprise at least one of
an outlier removal operation,
a data clustering operation, or
a kernel density estimation operation.

4. The method of claim 2, wherein the generating further comprises:
retrieving the portion of the data, wherein
each of the one or more features of the data of the new backup image and each of the one or more existing features of the data of the each existing backup image comprises a lower bound of a data container identifier range, a mean of the data container identifier range, and an upper bound of the data container identifier range, and
the logical size is a size of data at the mean of the data container identifier range.

5. The method of claim 1, wherein the comparing comprises:
comparing one or more features of the new feature information and one or more features of the existing feature information.

6. The method of claim 2, wherein
the one or more data pre-processing operations comprise a data clustering operation,
the data clustering operation comprises a density-based clustering algorithm, and
the distance determination operation comprises
calculating a relative entropy between a first probability density function and a second probability density function.

7. The method of claim 6, wherein
the density-based clustering algorithm is a density-based spatial clustering of applications with noise (DBSCAN) algorithm,
the new feature information is represented by the first probability density function calculated using the DBSCAN algorithm,
the existing feature information is represented by the second probability density function calculated using the DBSCAN algorithm, and
the distance is defined by a relative entropy between the first probability density function and the second probability density function.

8. The method of claim 1, wherein the selecting comprises:
identifying the selected existing backup images, wherein the identifying comprises
determining a number of the selected existing backup images, and
determining a backup identifier for each of the selected existing backup images.

9. The method of claim 1, wherein
the one or more existing backup images are prefetched prior to a deduplication operation being performed on the new backup image.

10. The method of claim 1, wherein
the new feature information comprises
a mean value for a first feature,
a covariance for the first feature, and
sampled data for the first feature, and
the existing feature information comprises
a mean value for a second feature,
a covariance for the second feature, and
sampled data for the second feature.

11. A non-transitory computer-readable storage medium, comprising program instructions, which, when executed by one or more processors of a computing system, perform a method comprising:
generating new feature information for a portion of data, wherein
the portion of the data is a sample of data of a new backup image,
the new backup image is a full image,
the sample of the data of the new backup image is the data of the new backup image that is within a sample window of the data of the new backup image,
the new feature information comprises one or more generative models for a machine learning process,
the new feature information of the sample of the data is representative of one or more features of the data of the new backup image by virtue of the one or more generative models being representative of one or more features of the data of the new backup image,
the one or more features are representative of container usage of the new backup image,
the container usage of the new backup image comprises a logical size of each of one or more fingerprints stored in a data container of the new backup image and a data container identifier of the data container of the new backup image, and
the machine learning process receives the portion of the data of the new backup image as an input;
for each existing backup image in a plurality of existing backup images,
comparing the new feature information with existing feature information, wherein
the each existing backup image is another full image,
the each existing backup image comprises existing data,
the existing feature information is representative of one or more existing features of the data of the each existing backup image,
the one or more existing features are representative of container usage of the each existing backup image,
the container usage of the each existing backup image comprises another logical size of each of one or more fingerprints stored in a data container of the each existing backup image and a data container identifier of the data container of the each existing backup image,
the existing feature information comprises one or more other generative models for the machine learning process,
the comparing comprises
performing a distance determination operation,
the distance determination operation determines a distance between a feature of the new feature information and a feature of the existing feature information based on the logical size of the each of the one or more fingerprints stored in the data container of the new backup image, the data container identifier of the data container of the new backup image, the another logical size of the each of the one or more fingerprints stored in the data container of the each existing backup image, and the data container identifier of the data container of the each existing backup image, and
the comparing results in corresponding distance information for the each existing backup image, with respect to the new feature information;

in response to the comparing, selecting one or more of the plurality of existing backup images as selected existing backup images, based, at least in part, on the corresponding distance information for each of the plurality of existing backup images; and
prefetching the selected existing backup images.

12. The non-transitory computer-readable storage medium of claim 11, wherein the generating comprises:
producing pre-processed data by performing one or more data pre-processing operations on the portion of the data; and
producing the new feature information by performing a feature extraction operation on the pre-processed data, wherein
the feature extraction operation is comprised in the machine learning process.

13. The non-transitory computer-readable storage medium of claim 12, wherein the generating further comprises:
retrieving the portion of the data, wherein
the one or more data pre-processing operations comprise at least one of
an outlier removal operation,
a data clustering operation, or
a kernel density estimation operation,
each of the one or more features of the data of the new backup image and each of the one or more existing features of the data of the each existing backup image comprises a lower bound of a data container identifier range, a mean of the data container identifier range, and an upper bound of the data container identifier range, and
the logical size is a size of data at the mean of the data container identifier range.

14. The non-transitory computer-readable storage medium of claim 12, wherein
the one or more data pre-processing operations comprise a data clustering operation,
the data clustering operation comprises a density-based clustering algorithm, the distance determination operation comprises
determining a distance between each feature of the new feature information and a feature of the existing feature information by calculating a relative entropy between a first probability density function and a second probability density function,
the density-based clustering algorithm is a density-based spatial clustering of applications with noise (DBSCAN) algorithm,
the new feature information is represented by the first probability density function calculated using the DBSCAN algorithm,
the existing feature information is represented by the second probability density function calculated using the DBSCAN algorithm, and
the distance is defined by a relative entropy between the first probability density function and the second probability density function.

15. The non-transitory computer-readable storage medium of claim 11, wherein the selecting comprises:
identifying the selected existing backup images, wherein the identifying comprises
determining a number of the selected existing backup images, and
determining a backup identifier for each of the selected existing backup images.

16. A computing system comprising:
one or more processors; and
a non-transitory computer-readable storage medium coupled to the one or more processors, comprising program instructions, which, when executed by the one or more processors, perform a method comprising
generating new feature information for a portion of data, wherein
the portion of the data is a sample of data of a new backup image,
the new backup image is a full image,
the sample of the data of the new backup image is the data of the new backup image that is within a sample window of the data of the new backup image,
the new feature information comprises one or more generative models for a machine learning process,
the new feature information of the sample of the data is representative of one or more features of the data of the new backup image by virtue of the one or more generative models being representative of one or more features of the data of the new backup image,
the one or more features are representative of container usage of the new backup image,
the container usage of the new backup image comprises a logical size of each of one or more fingerprints stored in a data container of the new backup image and a data container identifier of the data container of the new backup image, and
the machine learning process receives the portion of the data of the new backup image as an input,
for each existing backup image in a plurality of existing backup images,
comparing the new feature information with existing feature information, wherein
the each existing backup image is another full image,
the each existing backup image comprises existing data,
the one or more existing features are representative of container usage of the each existing backup image,
the container usage of the each existing backup image comprises another logical size of each of one or more fingerprints stored in a data container of the each existing backup image and a data container identifier of the data container of the each existing backup image,
the existing feature information comprises one or more other generative models for the machine learning process,
the comparing comprises
performing a distance determination operation,
the distance determination operation determines a distance between a feature of the new feature information and a feature of the existing feature information based on the logical size of the each of the one or more fingerprints stored in the data container of the new backup image, the data container identifier of the data container of the new backup image, the another logical size of the each of the one or more fingerprints stored in the data container of the each existing backup image, and the data container identifier of the data container of the each existing backup image, and the comparing results in corresponding distance information for the each existing backup image, with respect to the new feature information, in response to the comparing, selecting one or more of the plurality of existing backup images as selected existing backup images, based, at least in part, on the corresponding distance information for each of the plurality of existing backup images, and prefetching the selected existing backup images.

17. The computing system of claim 16, wherein the generating comprises:

producing pre-processed data by performing one or more data pre-processing operations on the portion of the data; and producing the new feature information by performing a feature extraction operation on the pre-processed data, wherein the feature extraction operation is comprised in the machine learning process.

18. The computing system of claim 17, wherein the generating further comprises:

retrieving the portion of the data, the one or more data pre-processing operations comprise at least one of an outlier removal operation, a data clustering operation, or a kernel density estimation operation, each of the one or more features of the data of the new backup image and each of the one or more existing features of the data of the each existing backup image comprises a lower bound of a data container identifier range, a mean of the data container identifier range, and an upper bound of the data container identifier range, and the logical size is a size of data at the mean of the data container identifier range.

19. The computing system of claim 17, wherein the one or more data pre-processing operations comprise a data clustering operation, the data clustering operation comprises a density-based clustering algorithm, the distance determination operation comprises determining a distance between each feature of the new feature information and a feature of the existing feature information by calculating a relative entropy between a first probability density function and a second probability density function, the density-based clustering algorithm is a density-based spatial clustering of applications with noise (DBSCAN) algorithm, the new feature information is represented by the first probability density function calculated using the DBSCAN algorithm, the existing feature information is represented by the second probability density function calculated using the DBSCAN algorithm, and the distance is defined by a relative entropy between the first probability density function and the second probability density function.

20. The computing system of claim 16, wherein the selecting comprises:

identifying the selected existing backup images, wherein the identifying comprises determining a number of the selected existing backup images, and determining a backup identifier for each of the selected existing backup images.

\* \* \* \* \*